United States Patent
Hirata et al.

(10) Patent No.: US 9,721,592 B1
(45) Date of Patent: Aug. 1, 2017

(54) PERPENDICULAR MAGNETIC RECORDING HEAD WITH TRAILING GAP COVERING MAGNETIC POLE AND SIDE GAPS AND METHOD OF MANUFACTURING SAME

(71) Applicant: TDK CORPORATION, Tokyo (JP)

(72) Inventors: Kei Hirata, Tokyo (JP); Shingo Miyata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/165,278

(22) Filed: May 26, 2016

(51) Int. Cl.
| G11B 5/31 | (2006.01) |
| G11B 5/127 | (2006.01) |
| G11B 5/11 | (2006.01) |
| G11B 5/48 | (2006.01) |

(52) U.S. Cl.
CPC ............ G11B 5/3116 (2013.01); G11B 5/112 (2013.01); G11B 5/1278 (2013.01); G11B 5/315 (2013.01); G11B 5/3169 (2013.01); G11B 5/4826 (2013.01); G11B 5/4833 (2013.01)

(58) Field of Classification Search
None
See application file for complete search history.

(56) References Cited

U.S. PATENT DOCUMENTS

| 7,898,773 | B2 | 3/2011 | Han et al. |
| 8,300,359 | B2 | 10/2012 | Hirata et al. |
| 8,400,732 | B2 | 3/2013 | Matono |
| 9,230,568 | B1 * | 1/2016 | Ikegawa et al. ..... G11B 5/1278 |
| 2002/0176214 | A1 * | 11/2002 | Shukh et al. ........ G11B 5/1278 360/125.3 |
| 2008/0068747 | A1 * | 3/2008 | Sasaki et al. ........ G11B 5/1278 360/110 |
| 2011/0002063 | A1 * | 1/2011 | Maruyama et al. . G11B 5/1278 360/75 |
| 2011/0205671 | A1 * | 8/2011 | Benakli et al. ...... G11B 5/1278 360/125.3 |
| 2013/0335854 | A1 * | 12/2013 | Etoh et al. ........... G11B 5/1278 360/119.02 |

* cited by examiner

*Primary Examiner* — Craig A. Renner
(74) *Attorney, Agent, or Firm* — Oliff PLC

(57) ABSTRACT

This perpendicular magnetic recording head includes: a magnetic pole; a pair of side shields disposed to face each other with the magnetic pole interposed therebetween in a cross track direction; a pair of side gaps each provided between the magnetic pole and the pair of side shields; a trailing gap provided to cover the magnetic pole and the pair of side gaps, and having a first width in the cross track direction; and a first magnetic layer covering the trailing gap and having a second width larger than the first width in the cross track direction.

11 Claims, 22 Drawing Sheets

PERPENDICULAR MAGNETIC RECORDING HEAD WITH TRAILING GAP COVERING MAGNETIC POLE AND SIDE GAPS AND METHOD OF MANUFACTURING SAME

BACKGROUND

The invention relates to a perpendicular magnetic recording head and a method of manufacturing the same.

In recent years, surface recording density of a magnetic recording medium (hereinafter referred to as "recording medium") represented by a hard disk has increased, and therefore an improvement in performance of a magnetic recording head has been desired. Accordingly, as a recording system of a magnetic recording head, in place of longitudinal magnetic recording of setting the direction of a magnetic field in an in-plane direction of a recording medium, perpendicular magnetic recording of setting in a direction perpendicular to the plane has been receiving attention. This is because it is possible to obtain such advantages that linear recording density increases, and a recorded recording medium is unlikely to be influenced by thermal fluctuation.

A magnetic recording head employing the perpendicular magnetic recording (hereinafter referred to as "perpendicular magnetic recording head") includes, in addition to a thin film coil for magnetic flux generation, a magnetic pole layer for guiding the magnetic flux generated in the thin film coil to a recording medium, and the like. This magnetic pole layer includes a minute-width end portion (a magnetic pole) for causing a magnetic field for recording (a recording magnetic field). Various studies have been made for such a perpendicular magnetic recording head (for example, refer to specification of U.S. Pat. No. 8,300,359, specification of U.S. Pat. No. 8,400,732, and specification of U.S. Pat. No. 7,898,773.

SUMMARY

Under the circumstances, in recent years, further optimization of a configuration of a perpendicular magnetic recording head has been strongly desired due to a trend towards a further increase in recording density of a recording medium. In other words, it is desired to implement a perpendicular magnetic recording head capable of supporting a higher recording density, as well as a head gimbals assembly, a head arm assembly, and a magnetic disk unit each including the perpendicular magnetic recording head.

A perpendicular magnetic recording head according to an embodiment of the invention includes: a magnetic pole; a pair of side shields disposed to face each other with the magnetic pole interposed therebetween in a cross track direction; a pair of side gaps each provided between the magnetic pole and the pair of side shields; a trailing gap provided to cover the magnetic pole and the pair of side gaps, and having a first width in the cross track direction; and a first magnetic layer covering the trailing gap and having a second width larger than the first width in the cross track direction.

A head gimbals assembly, a head arm assembly, and a magnetic disk unit according to respective embodiments of the invention each include the above-described perpendicular magnetic recording head.

In the perpendicular magnetic recording head according to the embodiment of the invention, the second width in the first magnetic layer covering the trailing gap is larger than the first width of the trailing gap, and therefore, for example, an effective volume of a high saturation flux density material in the cross track direction may increase. For this reason, a return field towards the trailing side increases, and improvement of a recording magnetic field as well as improvement of inclination of the recording magnetic field may be expected. Further, the trailing gap is provided to cover the magnetic pole and the pair of side gaps, and therefore a leakage of a recording magnetic field, which is released from the magnetic pole, to the first magnetic layer is suppressed. For this reason, according to the perpendicular magnetic recording head, the head gimbals assembly, the head arm assembly, and the magnetic disk unit of the respective embodiments of the invention, spread of the recording magnetic field in the cross track direction is suppressed, and an advantage is obtained in terms of support for high density recording.

DETAILED DESCRIPTION

An embodiment of the invention is described in detail below with reference to drawings.

<Configuration of Magnetic Disk Unit>

Figure 1:
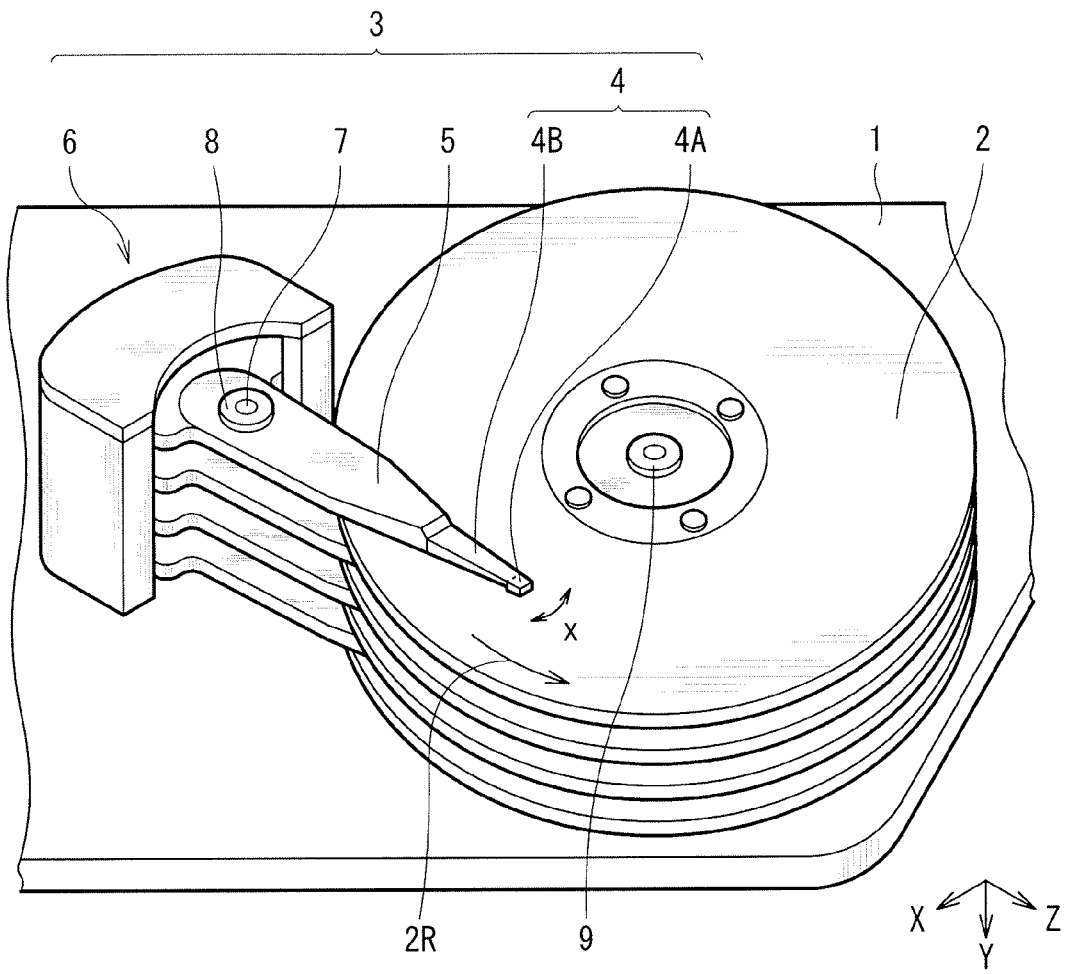
FIG. 1 is a perspective view illustrating a configuration of a magnetic disk unit with a thin film magnetic head serving as an embodiment of the invention.

First, referring to FIG. 1 and FIG. 2, a configuration of a magnetic disk unit according to an embodiment of the invention is described below. FIG. 1 is a perspective view illustrating an internal configuration of the magnetic disk unit according to the present embodiment. The magnetic disk unit adopts a load/unload system as a driving system, and may include, for example, in a housing 1, a magnetic disk 2 serving as a magnetic recording medium in which information is to be recorded, and a head arm assembly (HAA) 3 for recording information in the magnetic disk 2 and reproducing the information. The HAA 3 includes a head gimbals assembly (HGA) 4, an arm 5 supporting a base of the HGA 4, and a driver 6 serving as a power source for allowing the arm 5 to pivot. The HGA 4 includes a magnetic head slider (hereinafter, simply referred to as a "slider") 4A having a side surface provided with a thin film magnetic head 10 (described later) according to the present embodiment, and a suspension 4B having an end to which the slider 4A is attached. The arm 5 supports the other end of the suspension 4B (an end opposite to the end provided with the slider 4A). The arm 5 is so configured as to be pivotable, through a bearing 8, around a fixed shaft 7 fixed to the housing 1. The driver 6 may be configured of, for example, a motor such as a voice coil motor. Note that the magnetic disk unit has a plurality of (four in FIG. 1) magnetic disks 2, and the sliders 4A are disposed corresponding to recording surfaces (a front surface and a back surface) of the respective magnetic disks 2. Each of the sliders 4A is movable in a direction across recording tracks (in an X-axis direction) in a plane parallel to the recording surfaces of each of the magnetic disks 2. In contrast, the magnetic disk 2 is configured to rotate around a spindle motor 9 fixed to the housing 1, in a rotation direction 2R substantially orthogonal to the X-axis direction. The rotation of the magnetic disk 2 and the movement of the slider 4A cause information to be recorded into the magnetic disk 2 or cause recorded information to be read out.

Figure 2:
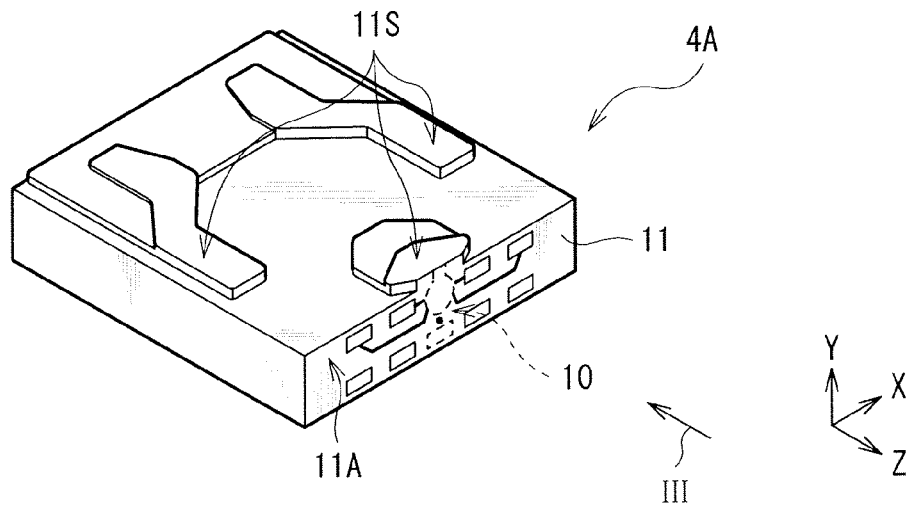
FIG. 2 is a perspective view illustrating a configuration of a slider in the magnetic disk unit illustrated in FIG. 1.

FIG. 2 illustrates a configuration of the slider 4A illustrated in FIG. 1. The slider 4A has a block-shaped base 11 that may be formed of, for example, AlTiC ($Al_2O_3 \cdot TiC$). The base 11 may be substantially formed as a hexahedron, for example, and one surface thereof corresponds to an air bearing surface (hereinafter referred to as ABS) 11S that is disposed in proximity to and facing the recording surface of the magnetic disk 2. When the magnetic disk unit is not driven, namely, when the spindle motor 9 is stopped and the magnetic disk 2 does not rotate, the slider 4A is in a state (an unloaded state) of remaining at a position outside a part above the magnetic disk 2, to avoid contact between the ABS 11S and the recording surface. In contrast, at startup, the spindle motor 9 causes the magnetic disk 2 to start rotating at high speed, the driver 6 causes the arm 5 to pivot around the fixed shaft 7 serving as a central axis, and the slider 4A then moves to be above the surface of the magnetic disk 2, thereby entering a loaded state. The high-speed rotation of the magnetic disk 2 causes air flow between the recording surface and the ABS 11S, and the slider 4A enters a state of floating along a direction (an Y-axis direction) orthogonal to the recording surface due to lift force caused by the air flow, so as to keep a certain distance (magnetic spacing) therebetween. In addition, the thin film magnetic head 10 is provided on an element forming surface 11A that is one side surface orthogonal to the ABS 11S.

<Detailed Configuration of Thin Film Magnetic Head 10>

Figure 3:
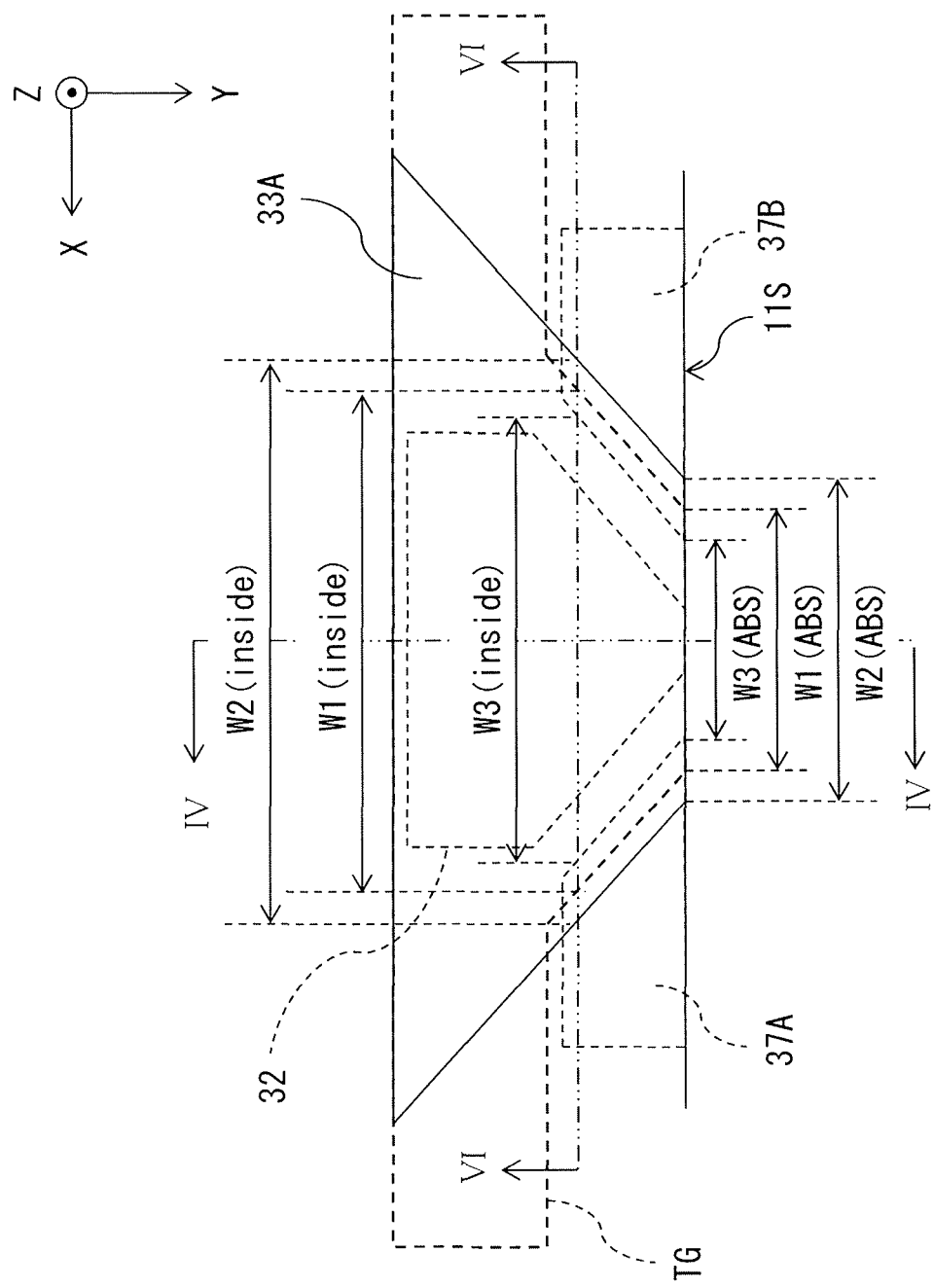
FIG. 3 is a plan view illustrating a configuration of a main part as viewed in an arrow III direction, of the thin film magnetic head illustrated in FIG. 2.
Figure 4:
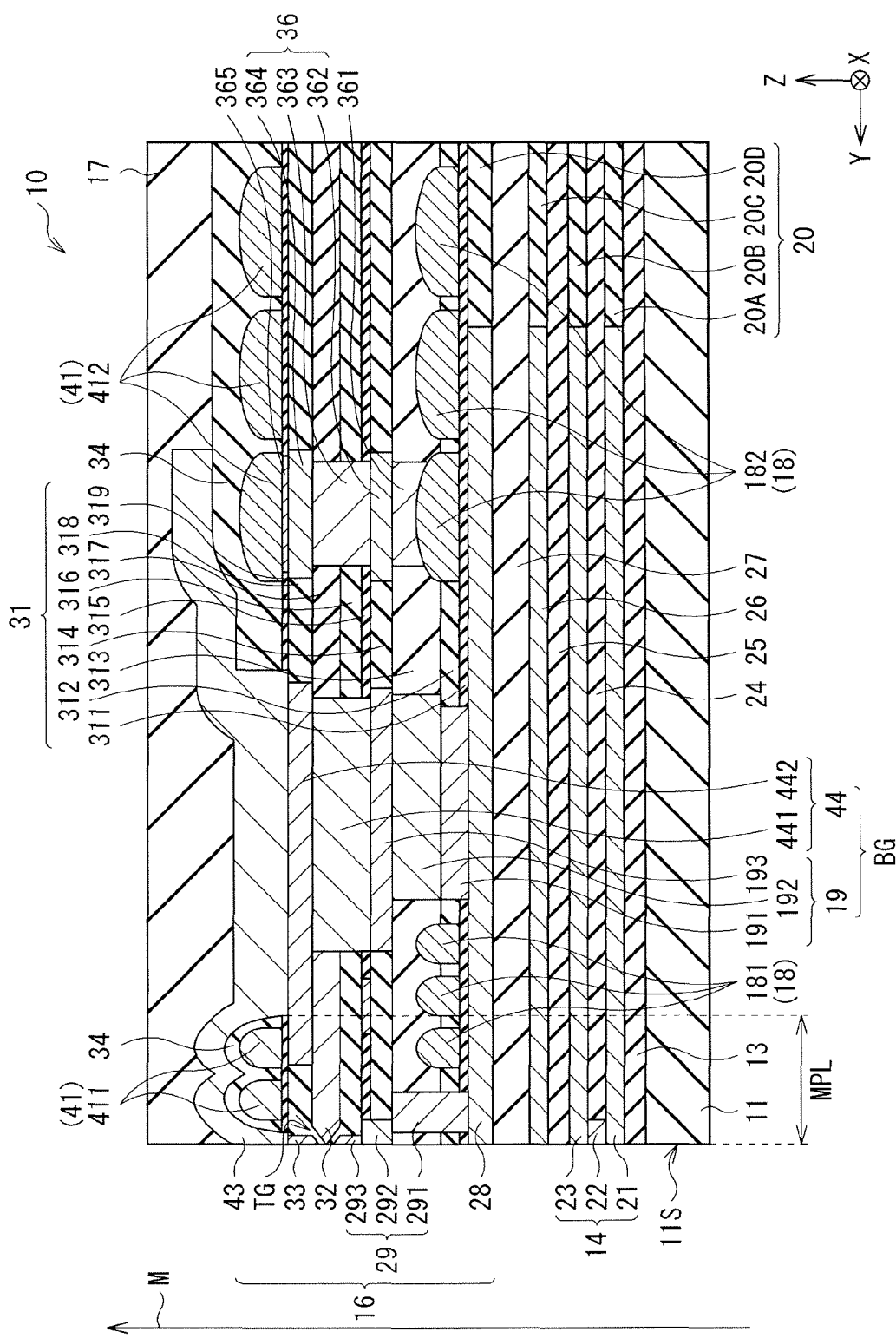
FIG. 4 is a sectional diagram illustrating a structure in an arrow direction along a IV-IV line, of the thin film magnetic head illustrated in FIG. 3.
Figure 5:
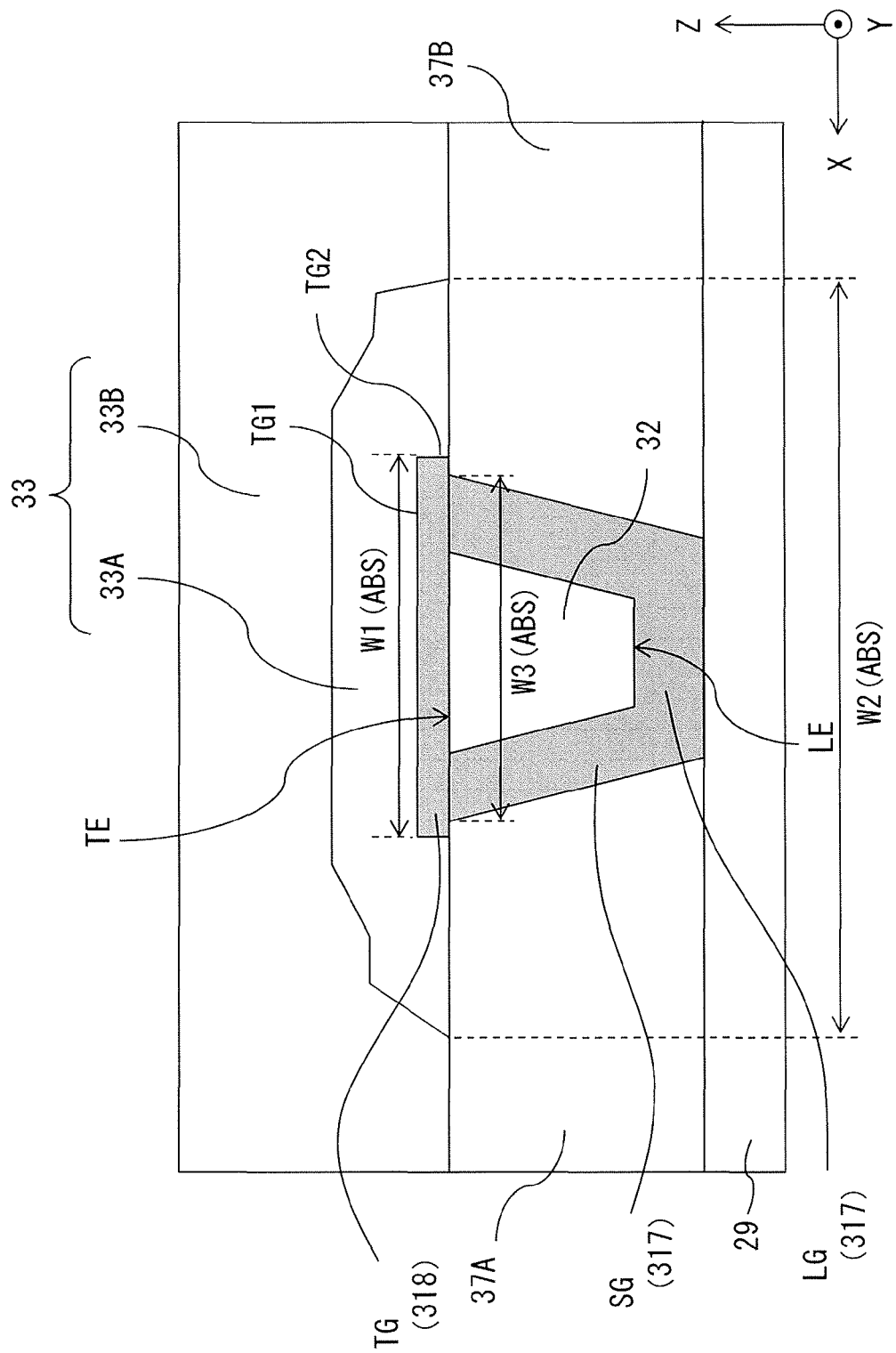
FIG. 5 is a sectional diagram illustrating an enlarged cross section parallel to an air bearing surface, of the thin film magnetic head illustrated in FIG. 2.
Figure 6:
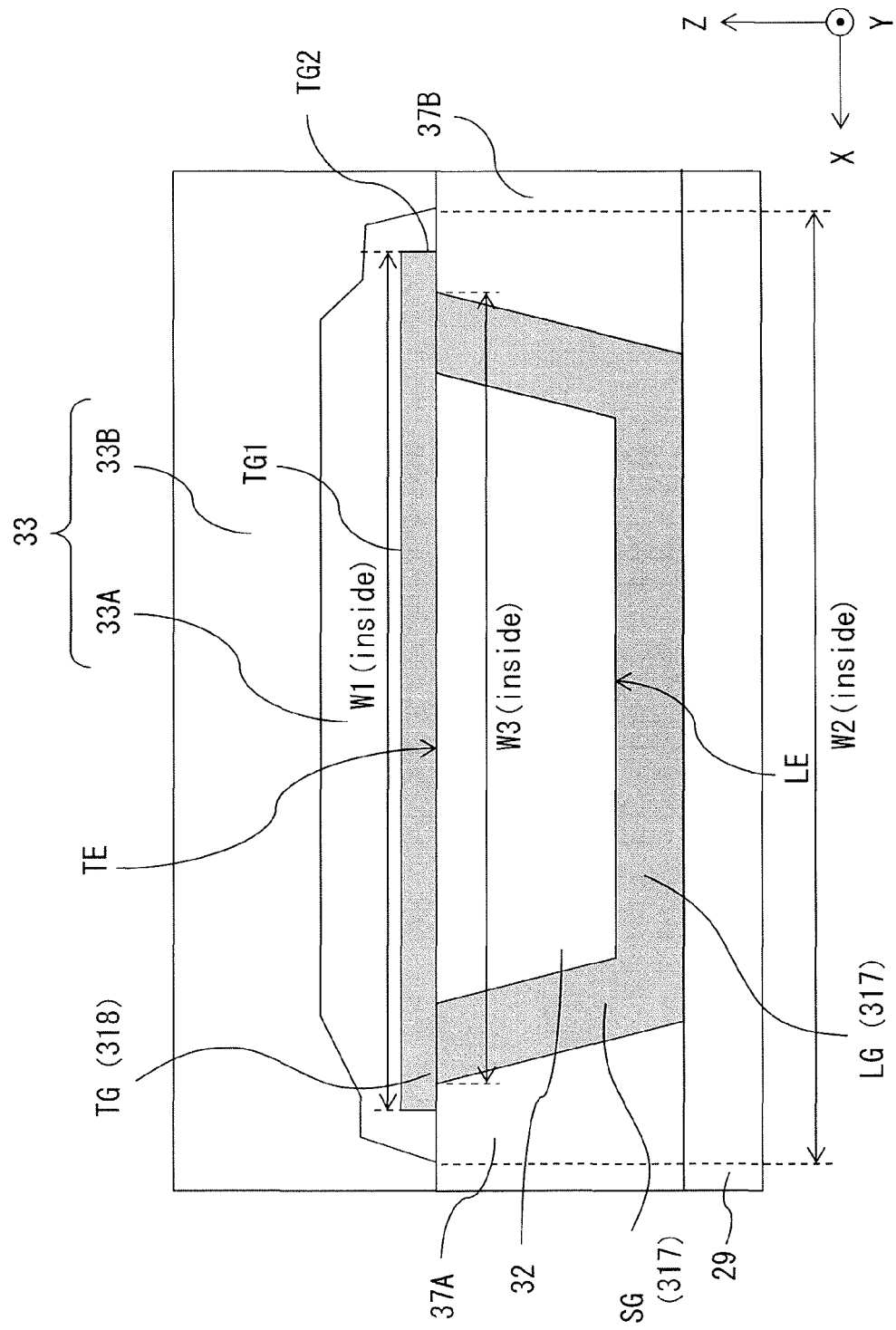
FIG. 6 is a sectional diagram illustrating a structure in an arrow direction along a VI-VI line, of the thin film magnetic head illustrated in FIG. 3.

Next, the thin film magnetic head 10 is described in more detail with reference to FIG. 3 to FIG. 6. FIG. 3 is a plan view illustrating the thin film magnetic head 10 as viewed in a direction of an arrow III illustrated in FIG. 2. FIG. 4 is a sectional diagram of the thin film magnetic head 10 at a center position thereof in an X-axis direction, and illustrates a structure in an arrow direction along a line IV-IV illustrated in FIG. 3. FIG. 5 and FIG. 6 are each a sectional diagram illustrating an enlarged cross section parallel to the ABS 11S, of the thin film magnetic head 10. However, FIG. 5 illustrates a cross-sectional structure at a position considerably close to the ABS 11S, and FIG. 6 illustrates a structure in an arrow direction along a VI-VI line illustrated in FIG. 3. Note that an up-arrow M illustrated in FIG. 4 indicates a direction in which the magnetic disk 2 moves relative to the thin film magnetic head 10.

In the following description, dimensions in the X-axis direction, the Y-axis direction, and a Z-axis direction are referred to as "width", "height", and "thickness", respectively, and closer side and farther side to/from the air bearing surface 11S in the Y-axis direction are referred to as "forward" and "backward", respectively. Moreover, front side and back side in the direction of the arrow M are referred to as "trailing side" and "leading side", respectively, and the X-axis direction and the Z-axis direction are referred to as "cross track direction" and "down track direction", respectively.

The thin film magnetic head 10 is provided to perform magnetic processing on the magnetic disk 2, and may be, for example, a composite head capable of performing both reproducing processing and recording processing.

As illustrated in FIG. 4, the thin film magnetic head 10 may include an insulating layer 13, a reproducing head section 14, a recording head section 16, and a protective layer 17 that are stacked in this order on the base 11. The thin film magnetic head 10 has the ABS 11S as one side surface common to these layers. An insulating layer 25, an intermediate shield layer 26, and an insulating layer 27 that are stacked in order on the reproducing head section 14 are provided between the reproducing head section 14 and the recording head section 16.

The insulating layer 13 and the protective layer 17 may be formed of, for example, a non-magnetic insulating material such as aluminum oxide. Examples of aluminum oxide may include alumina ($Al_2O_3$).

(Reproducing Head Section 14)

The reproducing head section 14 performs reproducing processing by utilizing magnetoresistive (MR) effect. The reproducing head section 14 may be configured by stacking, for example, a lower shield layer 21, an MR element 22, and an upper shield layer 23 in this order on the insulating layer 13.

The lower shield layer 21 and the upper shield layer 23 may be each formed of, for example, a soft magnetic metal material such as a nickel-iron alloy (NiFe), and are disposed to face each other with the MR element 22 interposed therebetween in the stacking direction (in the Z-axis direction). The lower shield layer 21 and the upper shield layer 23 each have a side surface exposed on the ABS 11S, and extend backward from the ABS 11S. Such a configuration allows the lower shield layer 21 and the upper shield layer 23 to exert a function of magnetically isolating the MR element 22 from its surroundings and protecting the MR element 22 from influence of unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 may be formed of an insulating material such as aluminum oxide ($Al_2O_3$), aluminum nitride (AlN), silicon dioxide ($SiO_2$), and diamond-like carbon (DLC).

The MR element 22 functions as a sensor to read out magnetic information recorded in the magnetic disk 2. The MR element 22 may be, for example, a current perpendicular to plane (CPP)-giant magnetoresistive (GMR) element, sense current of which flows inside thereof in a stacking direction. Here, the lower shield layer 21 and the upper shield layer 23 each function as an electrode to supply the sense current to the MR element 22.

In the reproducing head section 14 having such a configuration, a magnetization direction of a free layer (not illustrated) included in the MR element 22 changes in response to a signal magnetic field from the magnetic disk 2. Therefore, the magnetization direction of the free layer changes relative to a magnetization direction of a pinned layer (not illustrated) also included in the MR element 22. When the sense current flows through the MR element 22, the relative change of the magnetization direction appears as a change of the electric resistance, and the signal magnetic field is detected with use of this change and the magnetic information is accordingly read out.

As mentioned above, the insulating layer 25, the intermediate shield layer 26, and the insulating layer 27 are stacked in order on the reproducing head section 14. A resistance sensor (not illustrated) that is partially exposed on the ABS 11S may be embedded in the insulating layer 27. A lower yoke 28 forming a part of the recording head section 16 is provided on the insulating layer 27. The backward of the lower shield layer 21 is occupied by an insulating layer 20A, the backward of the upper shield layer 23 is occupied by an insulating layer 20B, the backward of the intermediate shield layer 26 is occupied by an insulating layer 20C, and the backward of the lower yoke 28 is occupied by an insulating layer 20D. Note that, in the specification, the insulating layers 20A to 20D are collectively referred to as an insulating layer 20 in some cases. The intermediate shield layer 26 functions to prevent a magnetic field generated in the recording head section 16 from reaching the MR element 22, and may be made of, for example, a soft magnetic metal material such as NiFe. The insulating layers 25 and 27 may be each made of a material similar to that of the insulating layer 24, for example.

(Recording Head Section 16)

The recording head section 16 is a so-called perpendicular magnetic recording head performing recording processing of perpendicular magnetic recording system. The recording head section 16 may include, for example, the lower yoke 28, a lower coil 18 as well as a leading shield 29 that are embedded in an insulating layer 31, a magnetic pole 32, a trailing shield 33, an upper coil 41 embedded in the insulating layer 34, and an upper yoke 43 that are stacked in this order on the insulating layer 27. A space between the lower coil 18 and the upper coil 41 at the back of the leading shield 29 is occupied by insulating layer 31 (311 to 319). Note that the magnetic pole 32 and the trailing shield 33 are away from each other, and a clearance therebetween is filled with the insulating layer 318, thereby forming a trailing gap TG. Further, the trailing shield 33 may include, for example, a first magnetic layer 33A and a second magnetic layer 33B (illustrated in FIG. 5 and FIG. 6) to be described later.

The recording head section 16 further includes a back gap BG configured of a lower back gap 19 and an upper back gap 44. The lower back gap 19 is coupled to the lower yoke 28, and the upper back gap 44 is coupled to the upper yoke 43. Here, the lower back gap 19 is configured by stacking magnetic layers 191 to 193 in order on the lower yoke 28. In addition, the upper back gap 44 is configured by stacking a magnetic layer 441 and a magnetic layer 442 in order on the magnetic layer 193 of the lower back gap 19. A top surface of the magnetic layer 442 is in contact with a bottom surface of the upper yoke 43.

The upper coil 41 generates, in response to supply of a current, a recording-use magnetic flux inside a magnetic path that is configured mainly of the leading shield 29, the lower yoke 28, the lower back gap 19, the upper back gap 44, the upper yoke 43, and the magnetic pole 32. In contrast, the lower coil 18 generates a magnetic flux for preventing a leakage mainly in order to prevent the recording-use magnetic flux generated in the upper coil 41 from unintentionally reaching (being leaked to) the reproducing head section 14. The current flows through the lower coil 18 in a direction opposite to a direction of the current flowing through the upper coil 41. The lower coil 18 and the upper coil 41 each may be formed of, for example, a high electroconductive material such as copper (Cu), and have a structure (a spiral structure) winding a region occupied by the back gap BG (the lower back gap 19 and the upper back gap 44) in the stacked-layer plane (in the XY plane), The lower coil 18 is provided on the insulating layer 311 and is embedded in the insulating layer 312 and the insulating layer 313. The upper coil 41 is provided on the insulating layer 319 and is embedded in the insulating layer 34. Further, a part of a backward part 182 of the lower coil 18 and a part of a backward part 412 of the upper coil 41 are coupled to each other through a pillar 36 that ext~h.ds in a thickness direction to penetrate the insulating layer 31. The lower coil 18 and rle upper coil 41 are coupled in series to each other through the pillar 36. The pillar 36 has a stacked structure configured of electroconductive layers 361 to 365 that are stacked in order between the backward part 182 of the lower coil 18 and the backward part 412 of the upper coil 41. Note that, in FIG. 3, only the ABS 11S, the magnetic pole 32, the trailing gap TG (the insulating layer 318), the magnetic layer 33A, and side shields 37A and 37B (FIG. 5 and FIG. 6) are illustrated, and other components are not illustrated in order not to spoil visibility.

A forward part 181 of the lower coil 18, namely, a part located between the lower back gap 19 and the ABS 11S, may desirably have a smaller size in the Y-axis direction, than the size, in the Y-axis direction, of the backward part 182 of the lower coil 18 that is located at the back of the lower back gap 19 (FIG. 4). Likewise, the size, in the Y-axis direction, of a forward part 411 of the upper coil 41 that is located between the upper back gap 44 and the ABS 11S may be desirably smaller than the size, in the Y-axis direction, of the backward part 412 of the upper coil 41 that is located at the back of the upper back gap 44 (FIG. 4). This is because making the forward part 181 and the forward part 411 smaller in the Y-axis direction is advantageous to a reduction in magnetic path length MPL (see FIG. 4).

The lower yoke 28, the leading shield 29, the lower back gap 19, the upper yoke 43, the upper back gap 44, and the pillar 36 may be each formed of, for example, a soft magnetic metal material with high saturation flux density such as NiFe. The lower yoke 28 and the upper yoke 43 are magnetically coupled to each other through the back gap BG. The leading shield 29 is coupled to a forward part of the top surface of the lower yoke 28, and is so disposed as to be partially exposed on the ABS 11S. The leading shield 29 may have a structure in which, for example, a lower layer part 291, an intermediate part 292, and an upper layer part 293 are stacked in order along the ABS 11S. In the example of FIG. 4, the lower layer part 291 is provided at a position slightly receded from the ABS 11S, and the intermediate part 292 and the upper layer part 293 are so provided as to be exposed on the ABS 11S. The insulating layers 311 to 316 are so stacked in order at the back of the leading shield 29 as to cover the lower yoke 28 and to bury the lower coil 18.

The leading shield 29 functions as a return path on the leading side, and disperses a part of a recording magnetic field emitted from the magnetic pole 32 to the leading side, thereby reducing a wide adjacent track erase (WATE) effective magnetic field. The WATE effective magnetic field means an effective magnetic field that influences adjacent tracks in a wide region (for example, two to ten tracks adjacent to a track to be written).

The magnetic pole 32 includes an end surface exposed on the ABS 11S and is configured to extend backward from the ABS 11S. The magnetic pole 32 may be formed of, for example, a magnetic material with high saturation flux density such as an iron-based alloy. Examples of the iron-based alloy may include an iron-cobalt alloy (FeCo) and an iron-cobalt-nickel alloy (FeCoNi). The magnetic pole 32 contains the magnetic flux generated in the lower coil 18 and the upper coil 41, and emits the magnetic flux from the end surface exposed on the ABS 11S, thereby generating a recording magnetic field.

In the recording head section 16 having such a configuration, a magnetic flux is generated, by the current (the write current) flowing through the upper coil 41, inside the magnetic path configured mainly by the leading shield 29, the lower yoke 28, the lower back gap 19, the upper back gap 44, the upper yoke 43, and the magnetic pole 32. As a result, the recording magnetic field (the signal magnetic field) is generated near the end surface, which is exposed on the ABS 11S, of the magnetic pole 32, and the recording magnetic field reaches a predetermined region of the recording surface of the magnetic disk 2.

(Detailed Configuration of Recording Head Section 16)

Detailed configuration of the recording head section 16 is described with reference to FIG. 5 and FIG. 6, in addition to FIG. 3 and FIG. 4. Note that, in FIG. 5 and FIG. 6, only components made of insulating materials are shaded and other components are indicated with white, in order to improve visibility.

As illustrated in FIG. 5 and FIG. 6, the recording head section 16 has the magnetic pole 32 provided on the leading shield 29 through a leading gap LG (a part of the insulating layer 317). The recording head section 16 further has a pair of side shields 37A and 37B disposed to face each other in the cross track direction, with a pair of side gaps SG (other part of the insulating layer 317) interposed therebetween. The recording head section 16 further has the trailing gap TG (a part of the insulating layer 318) provided to cover the magnetic pole 32 and the pair of side gaps SG. The trailing gap TG has a width W1 in the cross track direction. As illustrated in FIG. 3, the width W1 is smallest at the ABS 11S and becomes gradually larger with increase in distance from the ABS 11S. Therefore, assuming the width of the trailing gap TG near the ABS 11S is a width W1 (ABS) (see FIG. 3 and FIG. 5), and the width of the trailing gap TG at an inside position receded from the ABS 11S is a width W1 (inside) (see FIG. 3 and FIG. 6), the width W1 (inside) is larger than the width W1 (ABS) (W1 (ABS)<W1 (inside)).

The recording head section 16 further has the first magnetic layer 33A covering the trailing gap TG, and the second magnetic layer 33B provided to cover the first magnetic layer 33A. The first magnetic layer 33A and the second magnetic layer 33B integrally form the trailing shield 33. The first magnetic layer 33A is provided to cover both a surface TG1 and an end surface TG2 of the trailing gap TG. The first magnetic layer 33A has a width W2 in the cross track direction. The width W2 is larger than the width W1 (W2>W1). As illustrated in FIG. 3, as with the width W1, the width W2 is smallest at the ABS 11S and becomes gradually larger with increase in distance from the ABS 11S. Therefore, assuming that the width of the first magnetic layer 33A near the ABS 11S is a width W2 (ABS) (see FIG. 3 and FIG. 5), and the width of the first magnetic layer 33A at an inside position receded from the ABS 11S is a width W2 (inside) (see FIG. 3 and FIG. 6), the width W2 (inside) is larger than the width W2 (ABS) (W2 (ABS)<W2 (inside)).

The first magnetic layer 33A has saturation flux density higher than saturation flux density of the second magnetic layer 33B. Specifically, the first magnetic layer 33A may be configured of, for example, a high saturation flux density magnetic material such as materials including an iron-cobalt alloy (FeCo), an iron-palladium alloy (FePd), an iron-cobalt-palladium alloy (FeCoPd), and iron nitride (FeN). The pair of side shields 37A and 37B have saturation flux density lower than the saturation flux density of the first magnetic layer 33A.

The magnetic pole 32 has a trapezoidal cross section in which the width of a trailing edge TE is larger than the width of a leading edge LE, as illustrated in FIG. 5. As illustrated in FIG. 3, as with the width W1 and the width W2, the width in the cross track direction in the trailing edge TE, of the magnetic pole 32, is smallest at the ABS 11S and becomes gradually larger with increase in distance from the ABS 11S. The width in the cross track direction in the pair of side gaps SG is substantially constant. Therefore, a total width W3 of the magnetic pole 32 and the pair of side gaps SG in the cross track direction is smallest at the ABS 11S and becomes gradually larger with increase in distance from the ABS 11S. In other words, assuming that the width W3 near the ABS 11S is a width W3 (ABS) (see FIG. 3 and FIG. 5), and the width W3 at an inside position receded from the ABS 11S is a width W3 (inside) (see FIG. 3 and FIG. 6), the width W3 (inside) is larger than the width W3 (ABS) (W3 (ABS)<W3 (inside)).

The magnetic pole 32 and the first magnetic layer 33A as well as the second magnetic layer 33B are away from each other. This is because the magnetic pole 32 is surrounded by the leading gap LG, the pair of side gaps SG, and the trailing gap TG, without any clearance.

The recording head section 16 is configured to satisfy the following conditional expression (1).

$$W3 \leq W1 < 2 \times W3 \qquad (1)$$

<Method of Manufacturing Thin Film Magnetic Head>

Next, a method of manufacturing a thin film magnetic head is described. FIG. 7 to FIG. 14 are each provided to describe a process in a method of manufacturing a main part of the thin film magnetic head 10. In the following, first, an overall manufacturing process is briefly described with reference to FIG. 4 to FIG. 6, and a manufacturing process for the main part is described with reference to FIG. 7 to FIG. 14.

[Summary]

The thin film magnetic head 10 is manufactured, mainly, by sequentially forming and stacking a series of components by using an existing thin film process. Examples of this existing thin film process may include film formation technologies such as electrolytic plating and sputtering, patterning technologies such as photolithography, etching technologies such as dry etching and wet etching, and polishing technologies such as chemical mechanical polishing (CMP).

When the thin film magnetic head 10 is manufactured, first, the insulating layer 13 is formed on the element forming surface 11A of a base 11, as illustrated in FIG. 4. Subsequently, the reproducing head section 14, the insulating layer 25, the intermediate shield layer 26, the insulating layer 27, and the recording head section 16 are sequentially formed on the insulating layer 13. Further, the protective layer 17 is formed on the recording head section 16, and then flattening processing is performed using a method such as CMP. Finally, there is performed a predetermined process such as forming the ABS 11S by applying mechanical polishing or pattern etching to a side surface of a stacked-layer structure from the base 11 to the protective layer 17. The thin film magnetic head 10 including the reproducing head section 14 and the recording head section 16 is thereby completed.

[Method of Manufacturing Main Part]

Figure 7A:
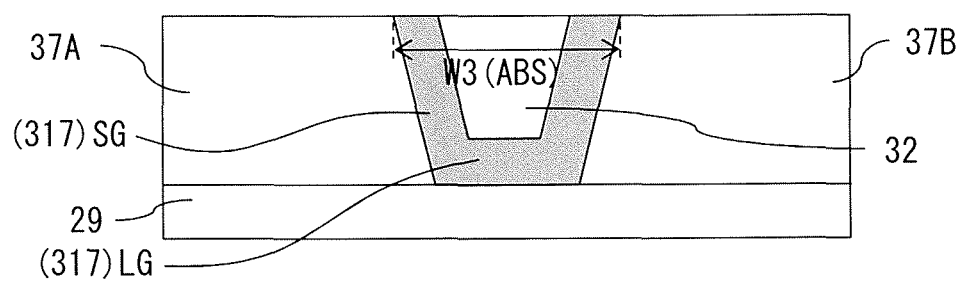
FIG. 7A is a sectional diagram illustrating a process in a method of manufacturing the thin film magnetic head illustrated in FIG. 2, and corresponding to FIG. 5.
Figure 7B:
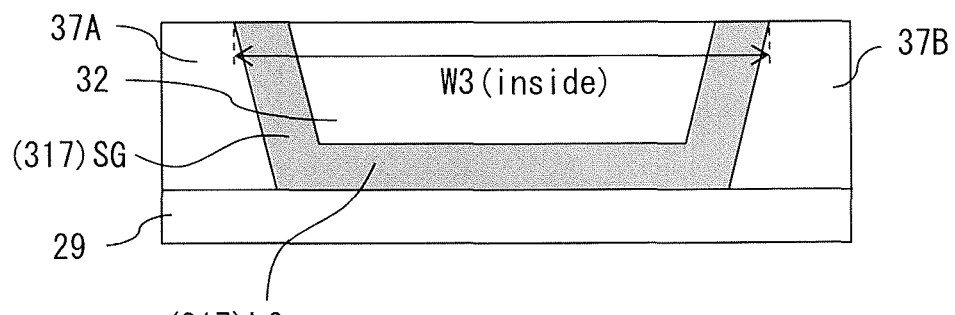
FIG. 7B is a sectional diagram illustrating the same process as the process in FIG. 7A, and corresponding to FIG. 6.
Figure 7C:
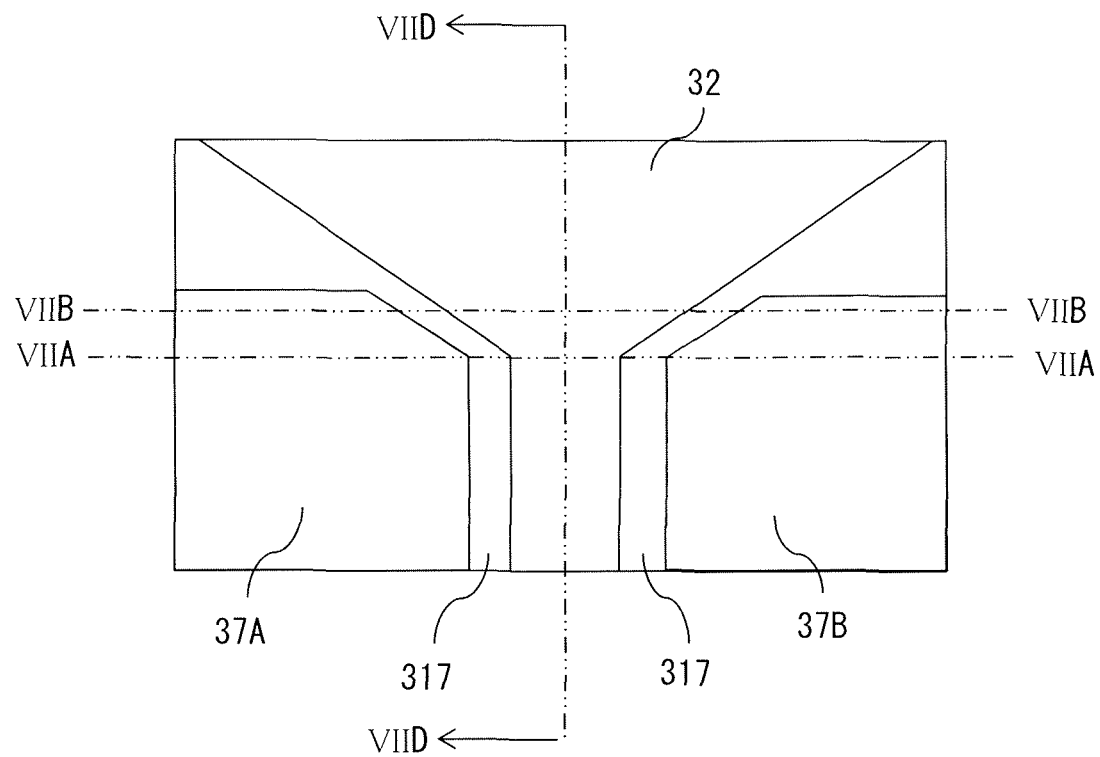
FIG. 7C is a plan view illustrating the same process as the process in FIG. 7A, and corresponding to FIG. 3.
Figure 7D:
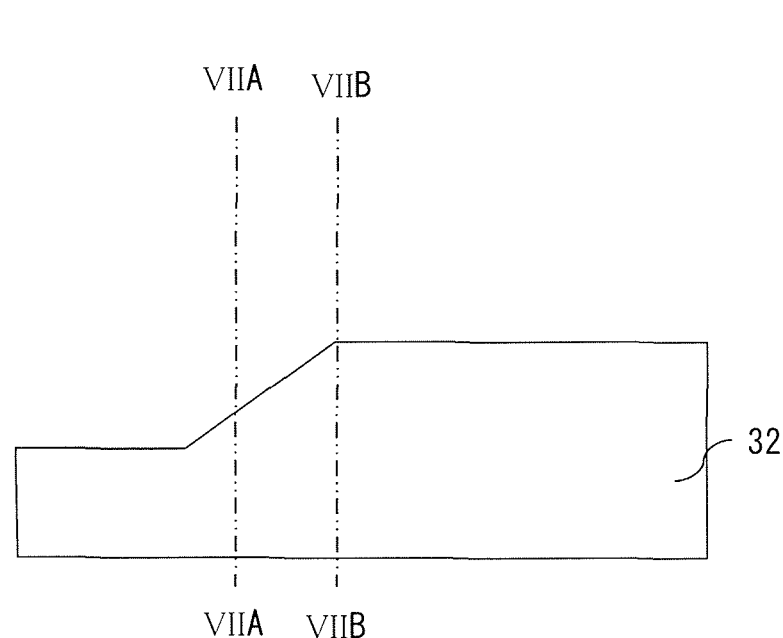
FIG. 7D is a sectional diagram illustrating the same process as the process in FIG. 7A, and corresponding to FIG. 4.
Figure 8A:
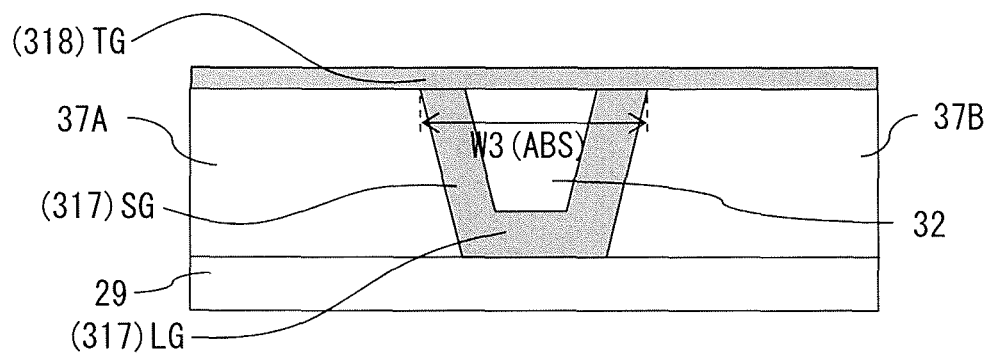
FIG. 8A is a sectional diagram illustrating a process following the process in FIG. 7A, and corresponding to FIG. 5.
Figure 8B:
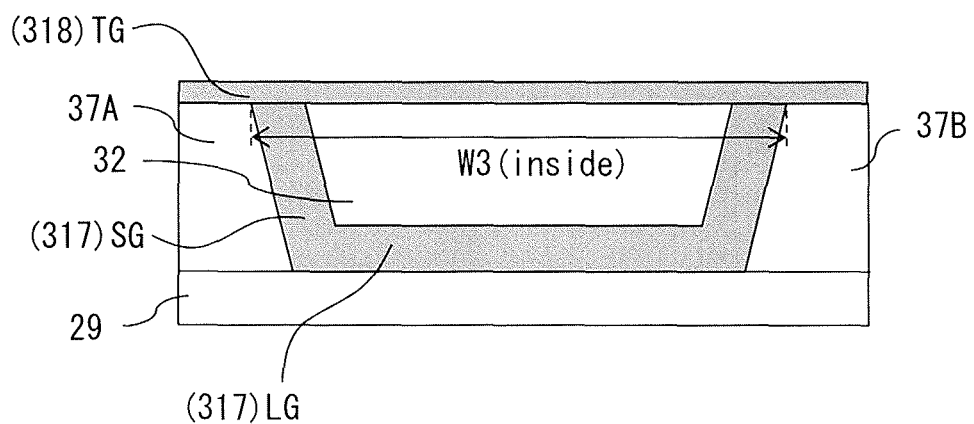
FIG. 8B is a sectional diagram illustrating the same process as the process in FIG. 8A, and corresponding to FIG. 6.
Figure 8C:
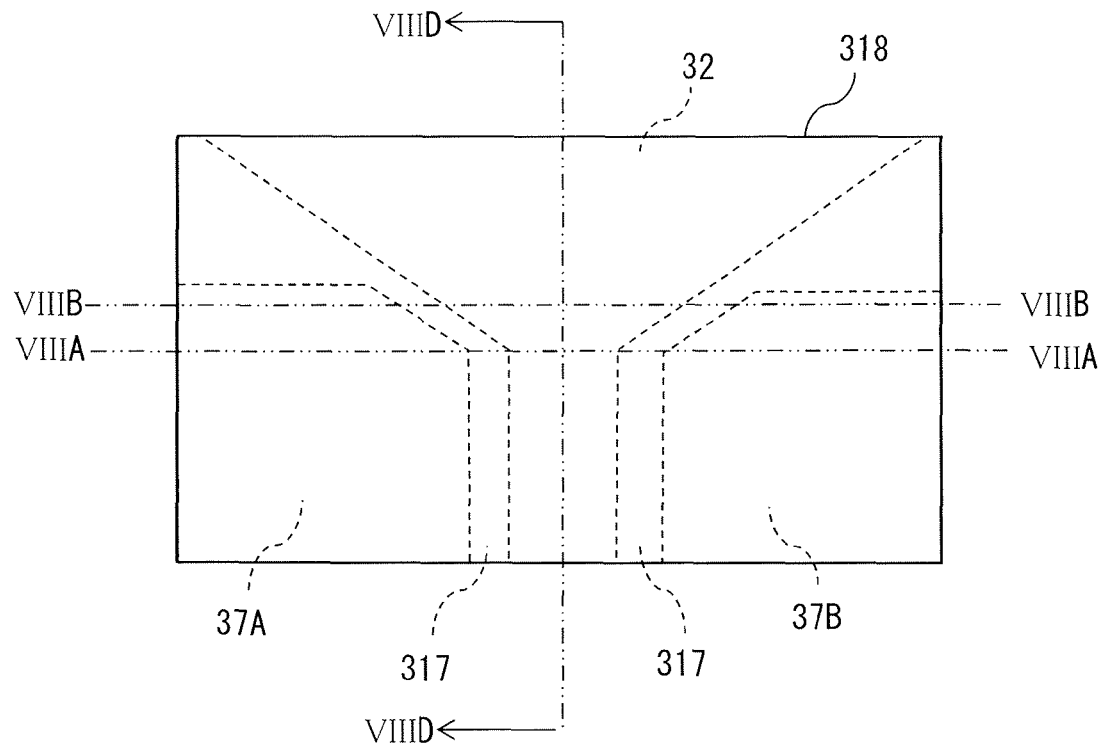
FIG. 8C is a plan view illustrating the same process as the process in FIG. 8A, and corresponding to FIG. 3.
Figure 8D:
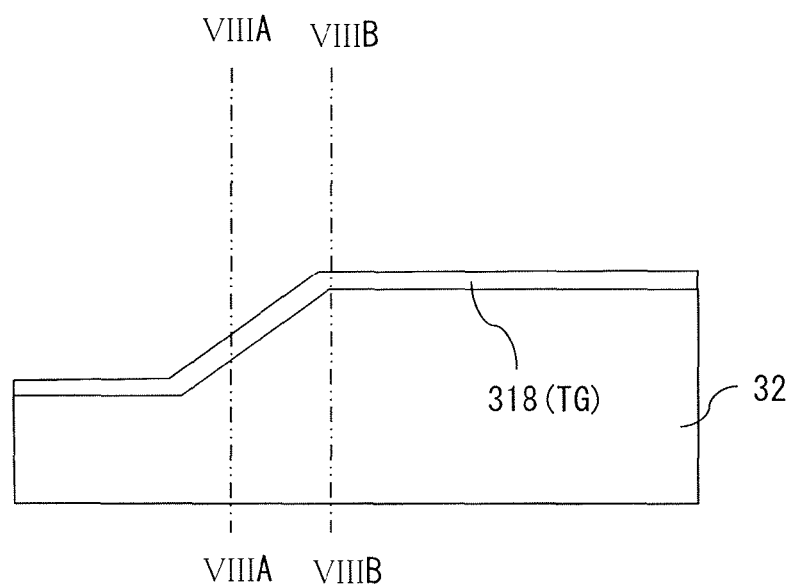
FIG. 8D is a sectional diagram illustrating the same process as the process in FIG. 8A, and corresponding to FIG. 4.
Figure 9A:
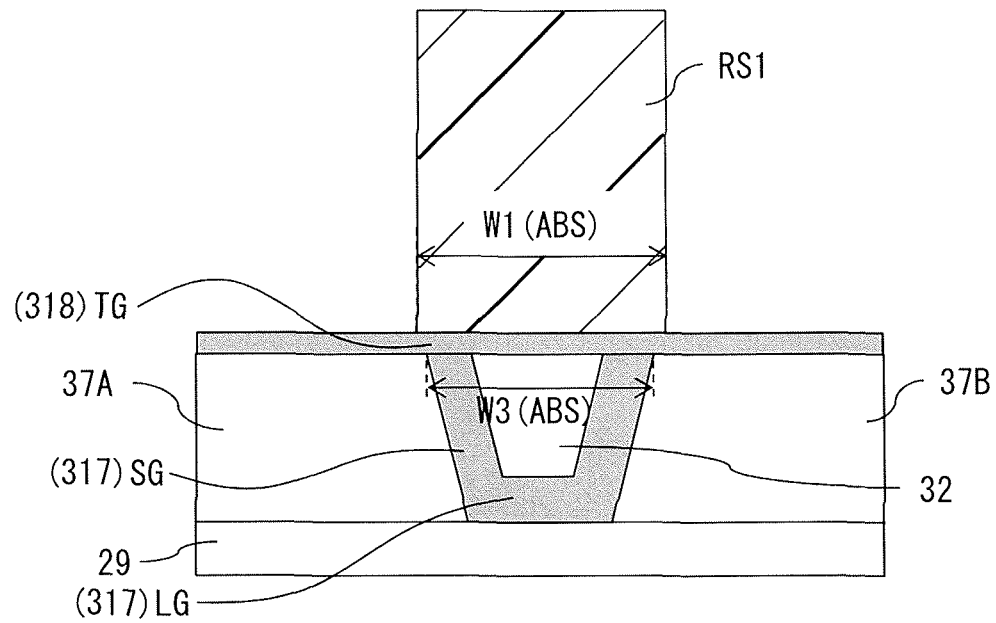
FIG. 9A is a sectional diagram illustrating a process following the process in FIG. 8A, and corresponding to FIG. 5.
Figure 9B:
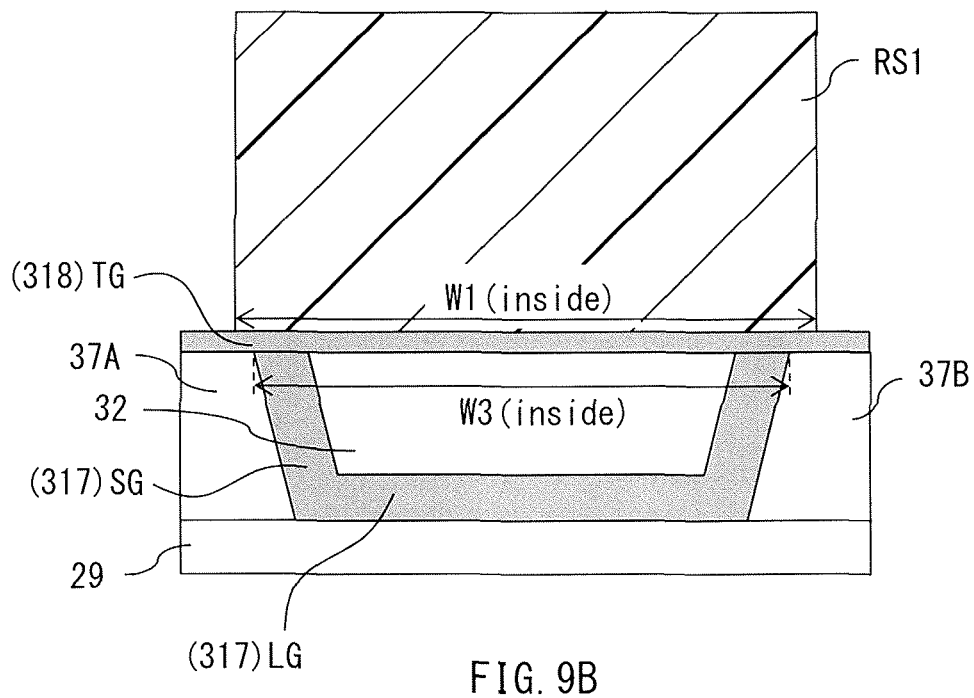
FIG. 9B is a sectional diagram illustrating the same process as the process in FIG. 9A, and corresponding to FIG. 6.
Figure 9C:
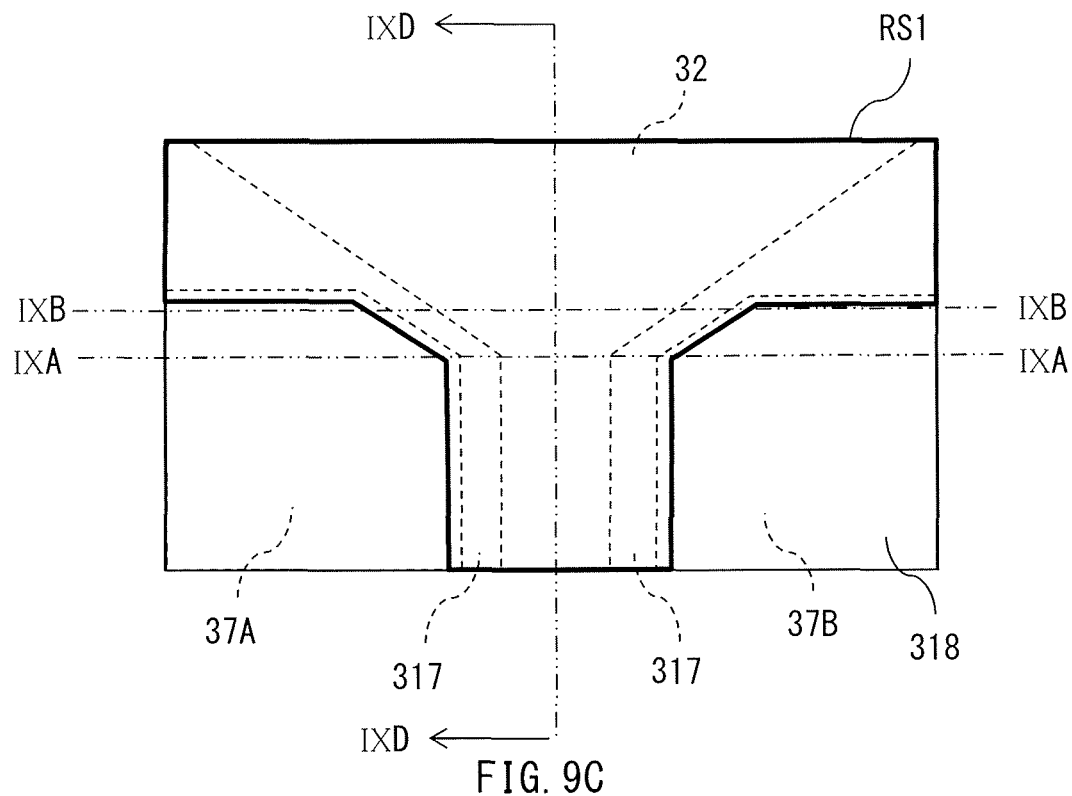
FIG. 9C is a plan view illustrating the same process as the process in FIG. 9A, and corresponding to FIG. 3.
Figure 9D:
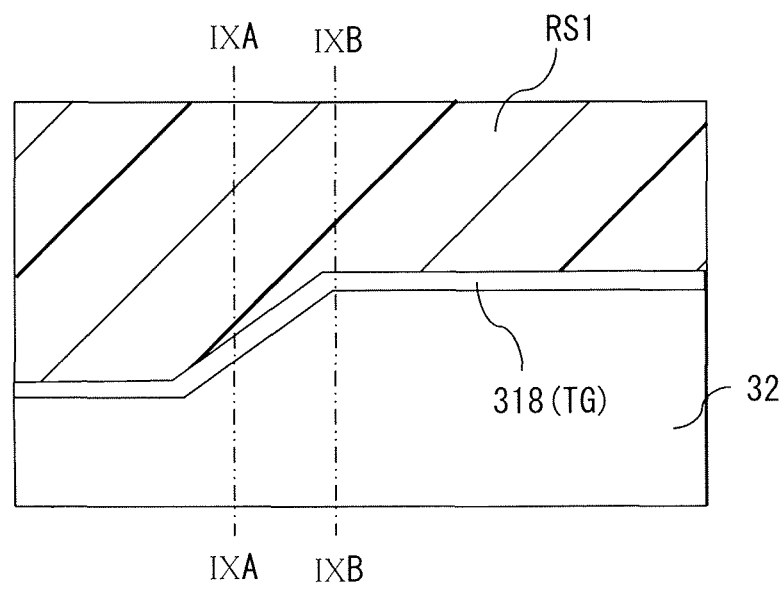
FIG. 9D is a sectional diagram illustrating the same process as the process in FIG. 9A, and corresponding to FIG. 4.
Figure 10A:
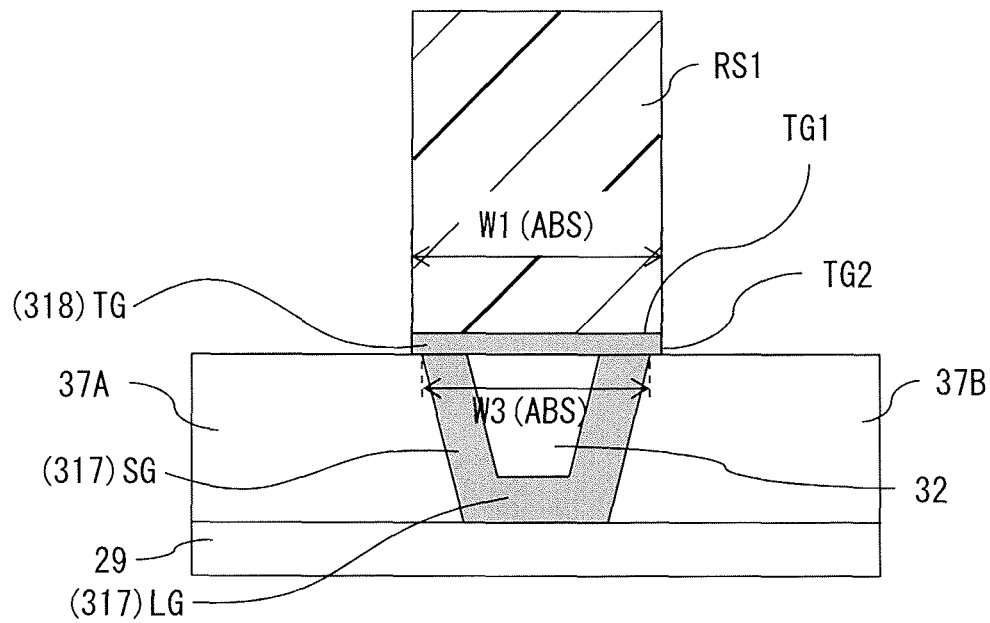
FIG. 10A is a sectional diagram illustrating a process following the process in FIG. 9A, and corresponding to FIG. 5.
Figure 10B:
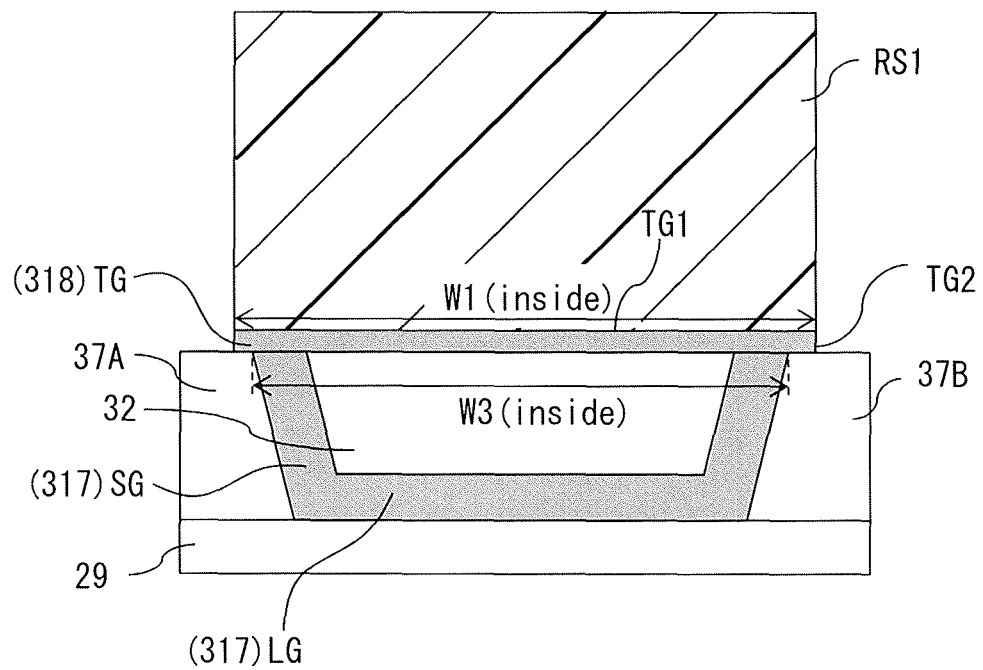
FIG. 10B is a sectional diagram illustrating the same process as the process in FIG. 10A, and corresponding to FIG. 6.
Figure 10C:
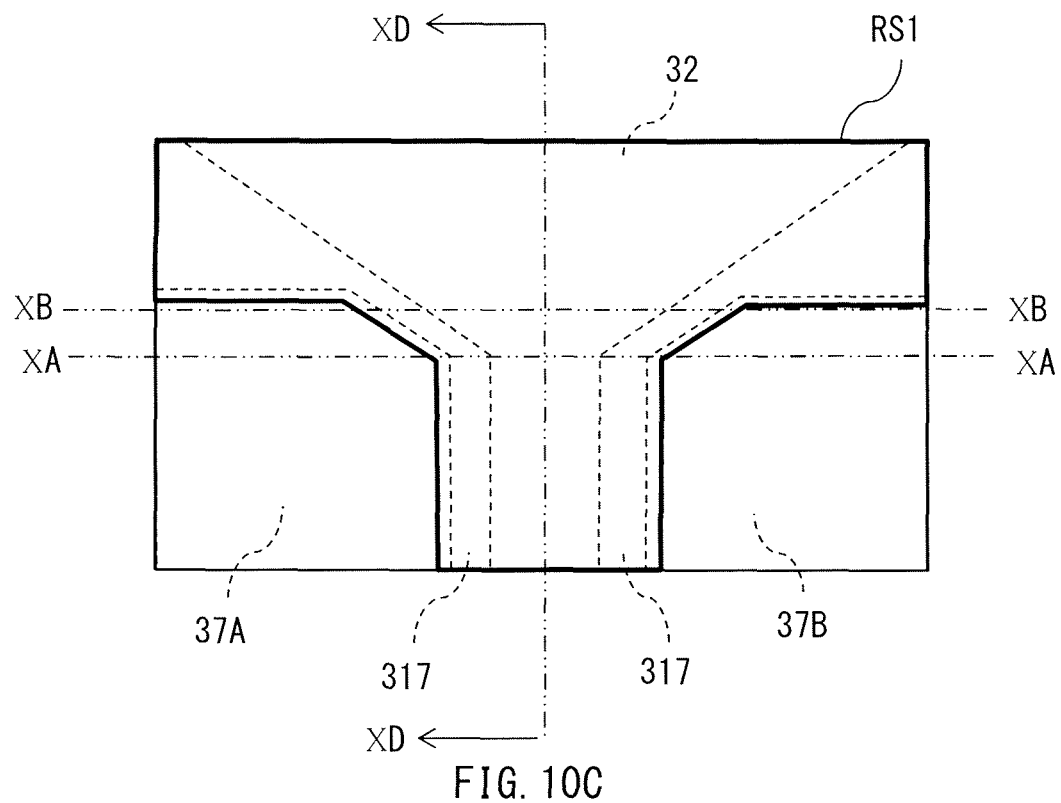
FIG. 10C is a plan view illustrating the same process as the process in FIG. 10A, and corresponding to FIG. 3.
Figure 10D:
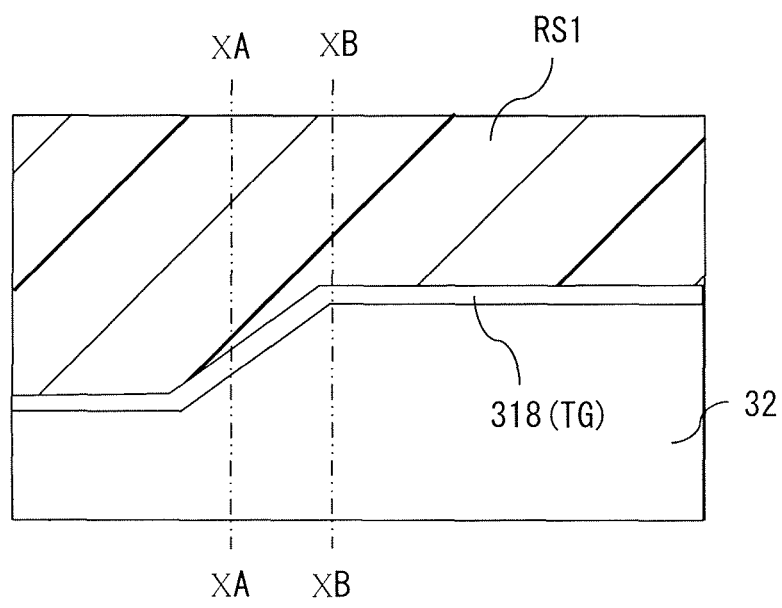
FIG. 10D is a sectional diagram illustrating the same process as the process in FIG. 10A, and corresponding to FIG. 4.
Figure 11A:
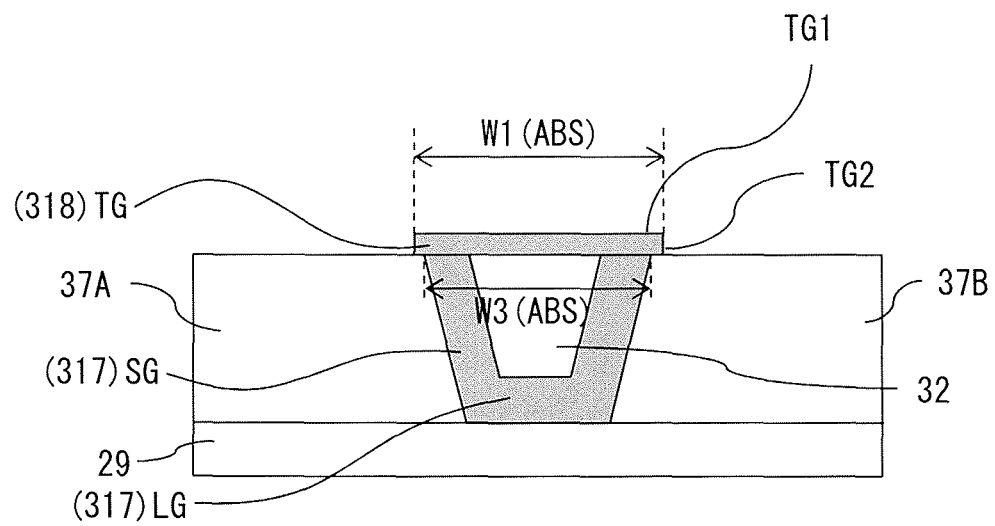
FIG. 11A is a sectional diagram illustrating a process following the process in FIG. 10A, and corresponding to FIG. 5.
Figure 11B:
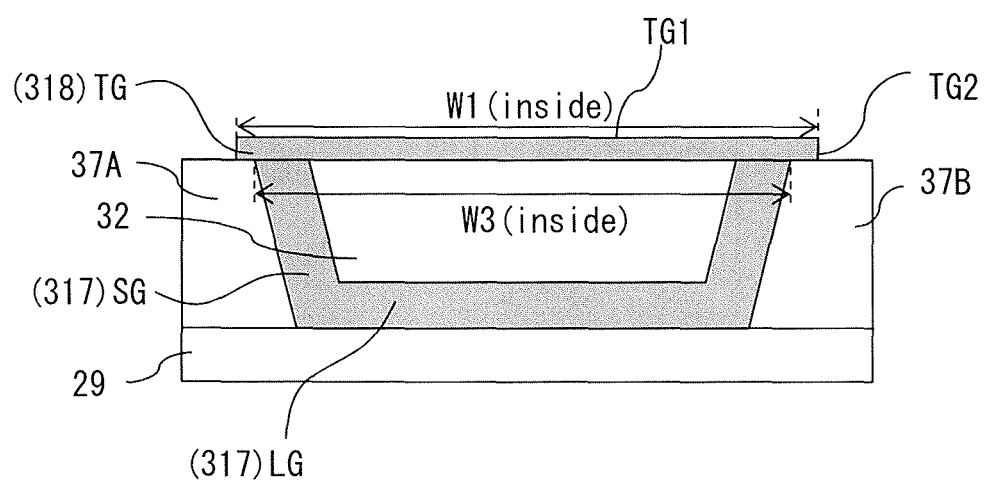
FIG. 11B is a sectional diagram illustrating the same process as the process in FIG. 11A, and corresponding to FIG. 6.
Figure 11C:
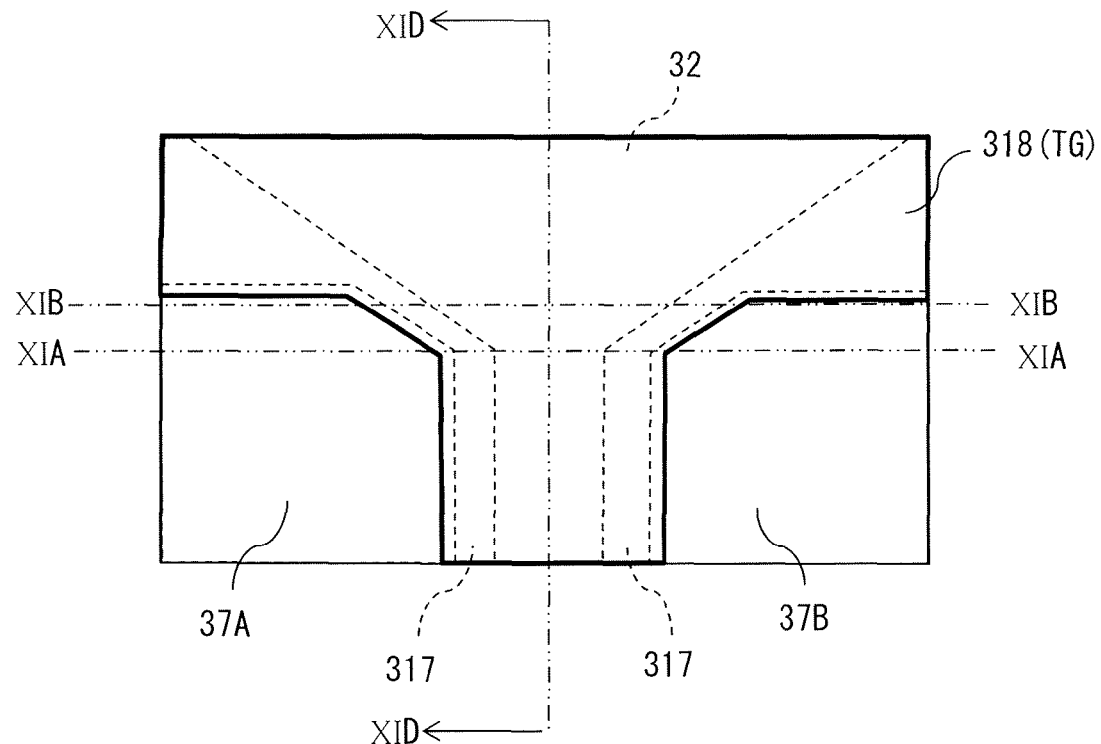
FIG. 11C is a plan view illustrating the same process as the process in FIG. 11A, and corresponding to FIG. 3.
Figure 11D:
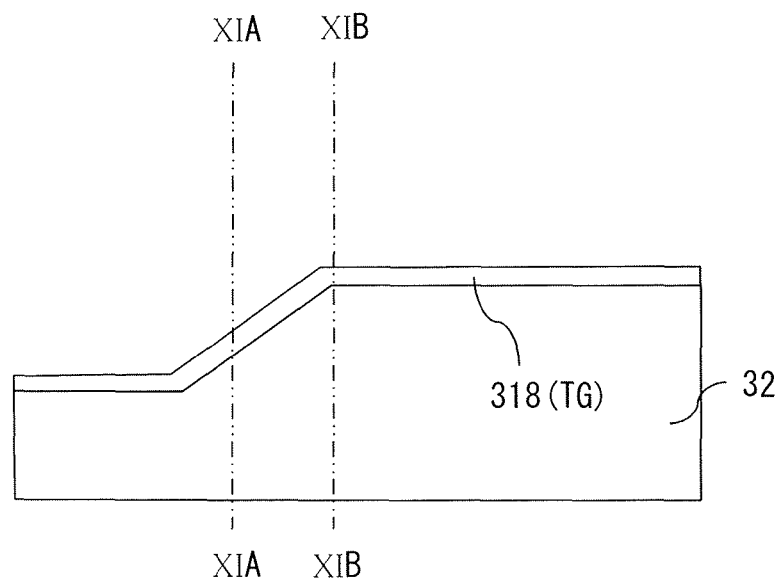
FIG. 11D is a sectional diagram illustrating the same process as the process in FIG. 11A, and corresponding to FIG. 4.
Figure 12A:
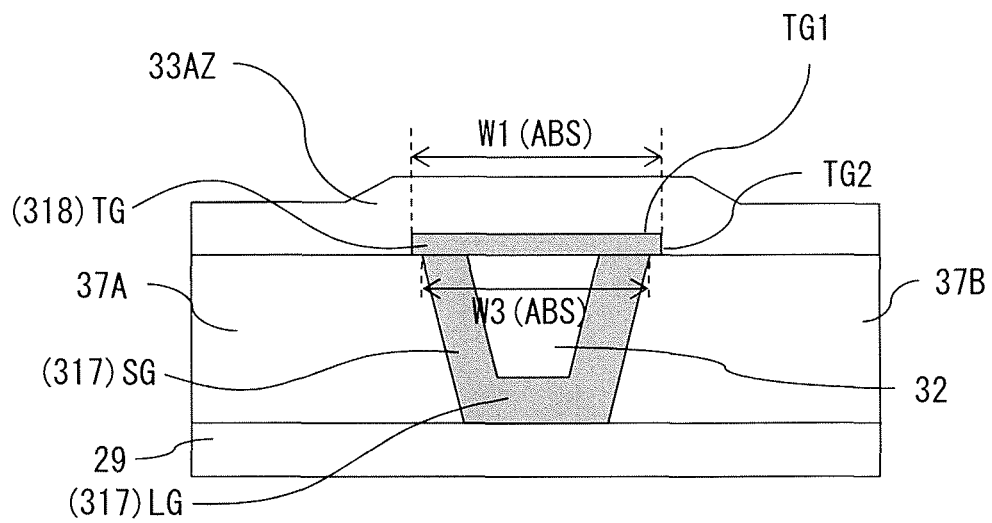
FIG. 12A is a sectional diagram illustrating a process following the process in FIG. 11A, and corresponding to FIG. 5.
Figure 12B:
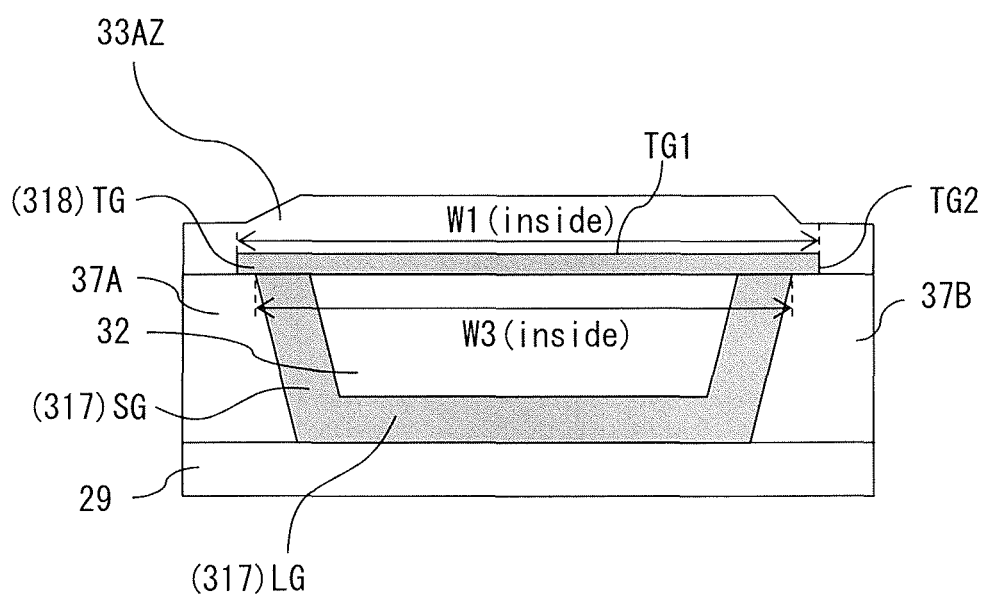
FIG. 12B is a sectional diagram illustrating the same process as the process in FIG. 12A, and corresponding to FIG. 6.
Figure 12C:
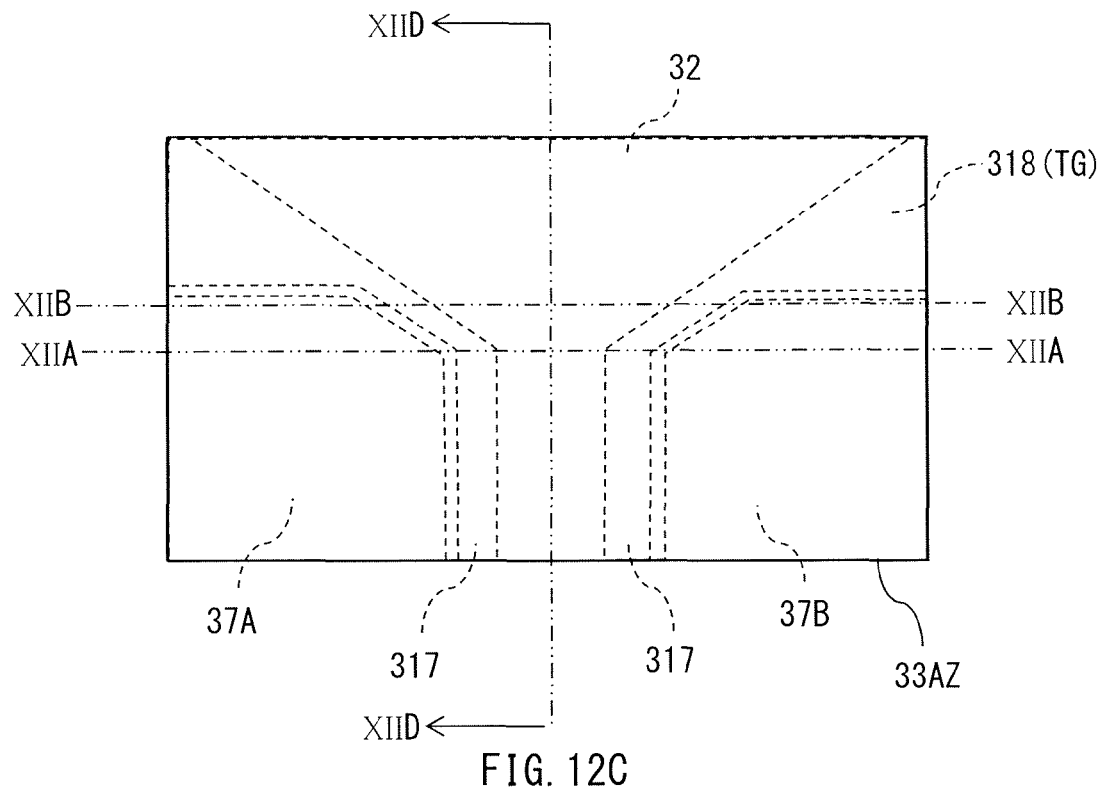
FIG. 12C is a plan view illustrating the same process as the process in FIG. 12A, and corresponding to FIG. 3.
Figure 12D:
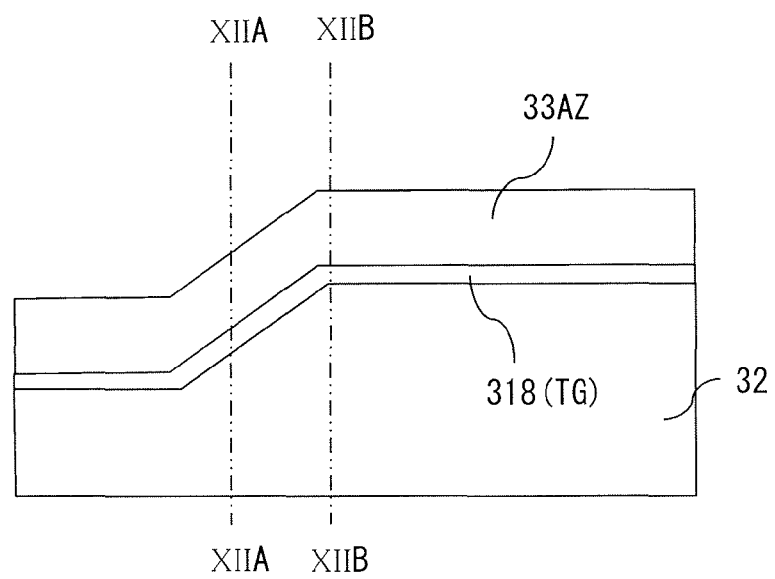
FIG. 12D is a sectional diagram illustrating the same process as the process in FIG. 12A, and corresponding to FIG. 4.
Figure 13A:
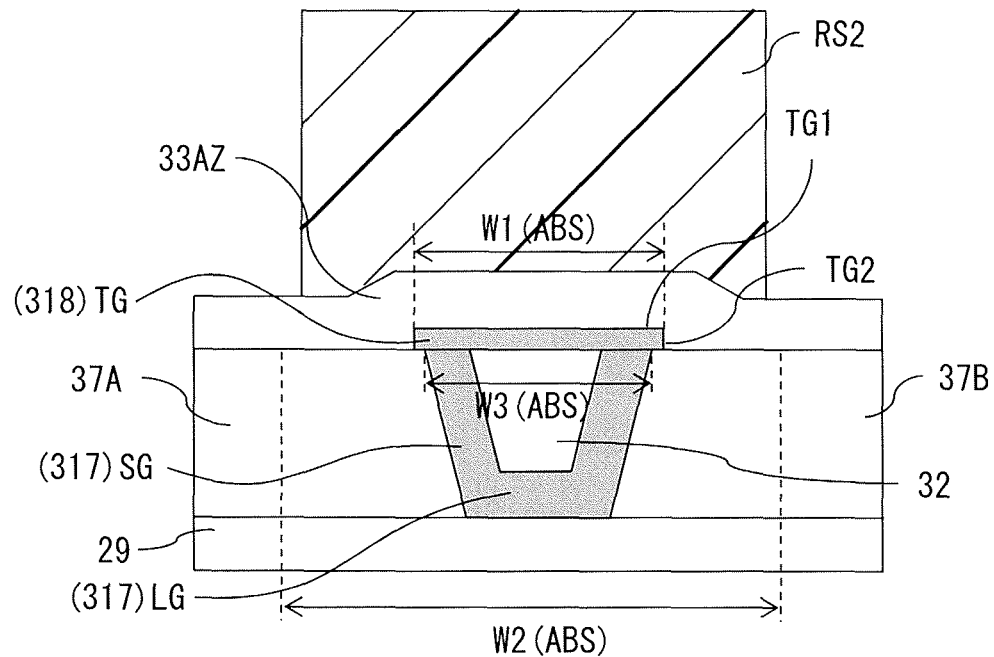
FIG. 13A is a sectional diagram illustrating a process following the process in FIG. 12A, and corresponding to FIG. 5.
Figure 13B:
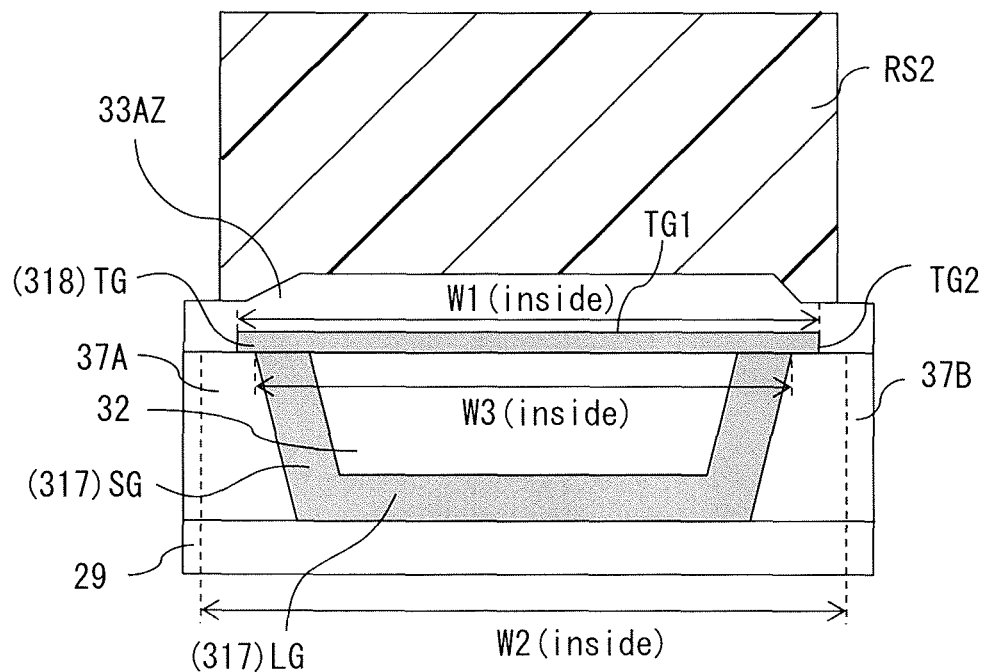
FIG. 13B is a sectional diagram illustrating the same process as the process in FIG. 13A, and corresponding to FIG. 6.
Figure 13C:
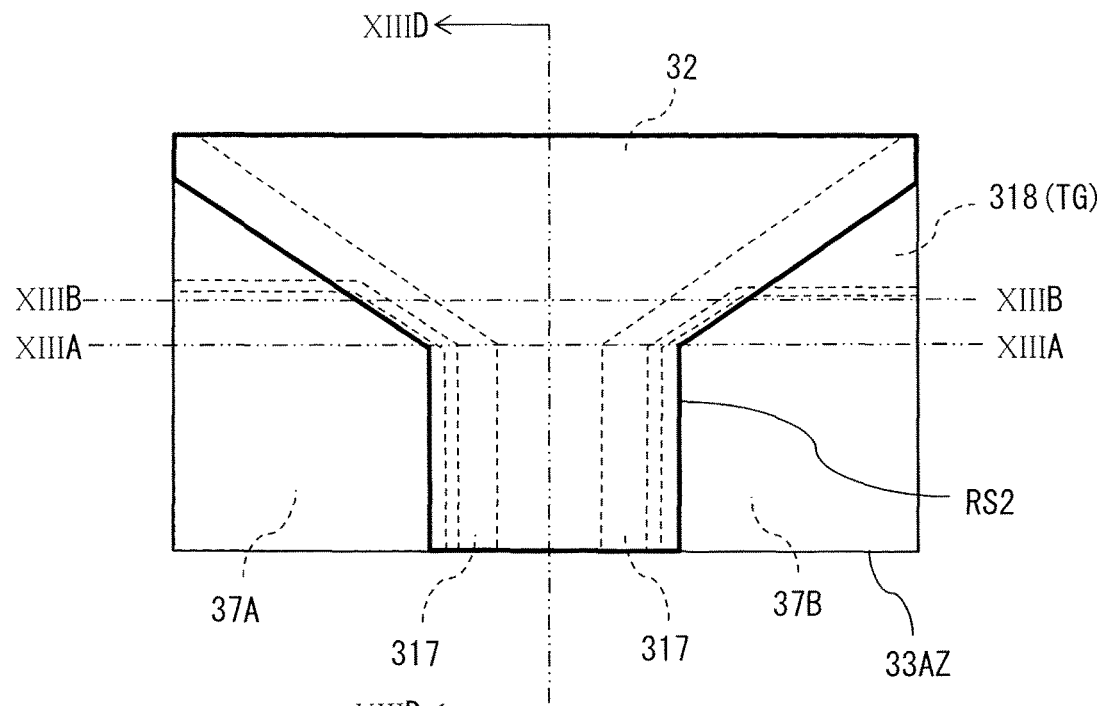
FIG. 13C is a plan view illustrating the same process as the process in FIG. 13A, and corresponding to FIG. 3.
Figure 13D:
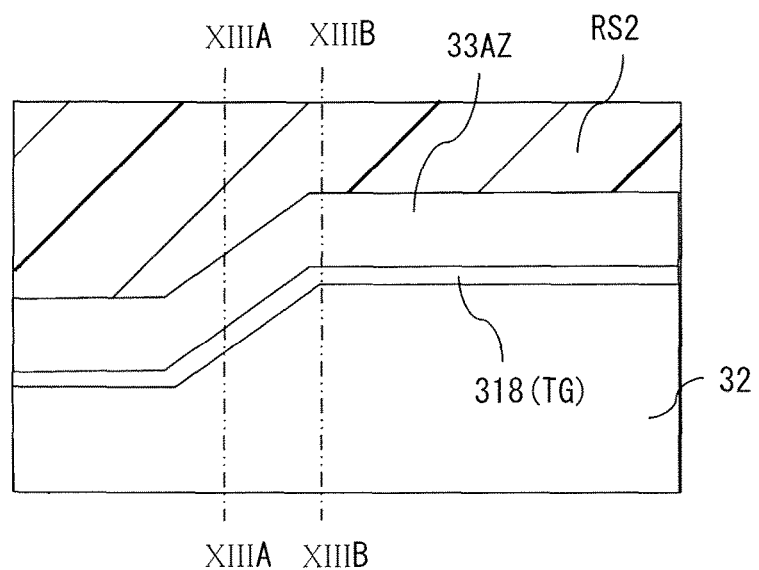
FIG. 13D is a sectional diagram illustrating the same process as the process in FIG. 13A, and corresponding to FIG. 4.
Figure 14A:
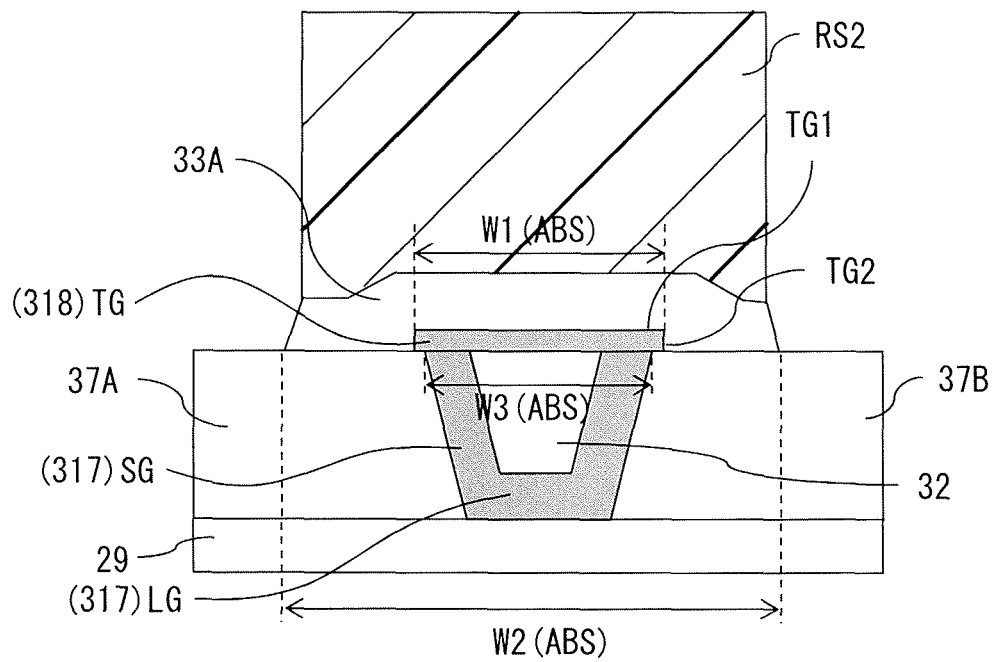
FIG. 14A is a sectional diagram illustrating a process following the process in FIG. 13A, and corresponding to FIG. 5.
Figure 14B:
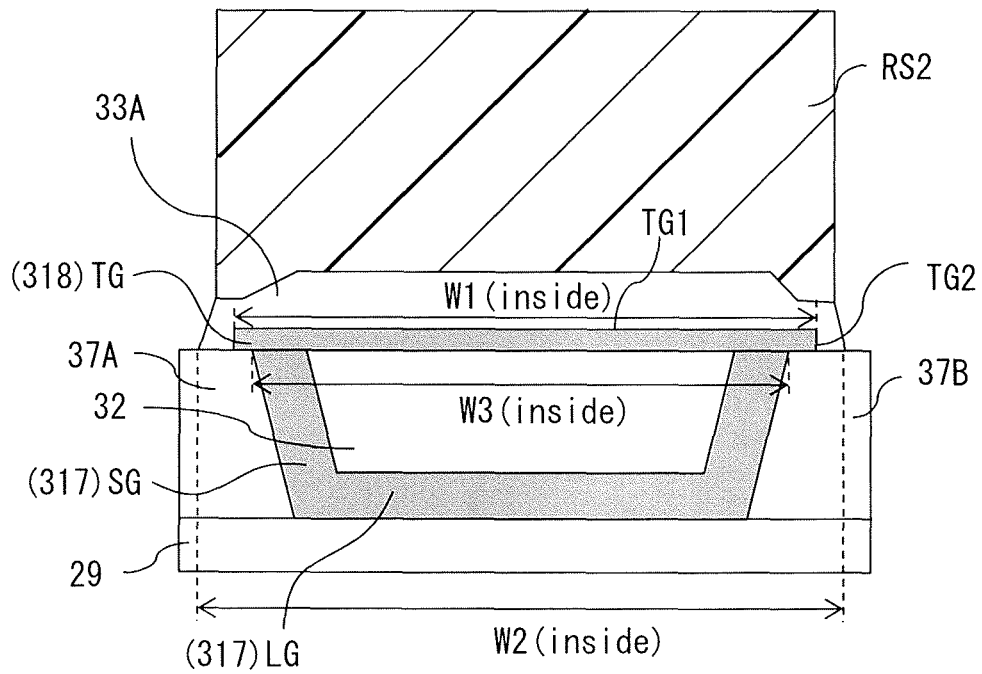
FIG. 14B is a sectional diagram illustrating the same process as the process in FIG. 14A, and corresponding to FIG. 6.
Figure 14C:
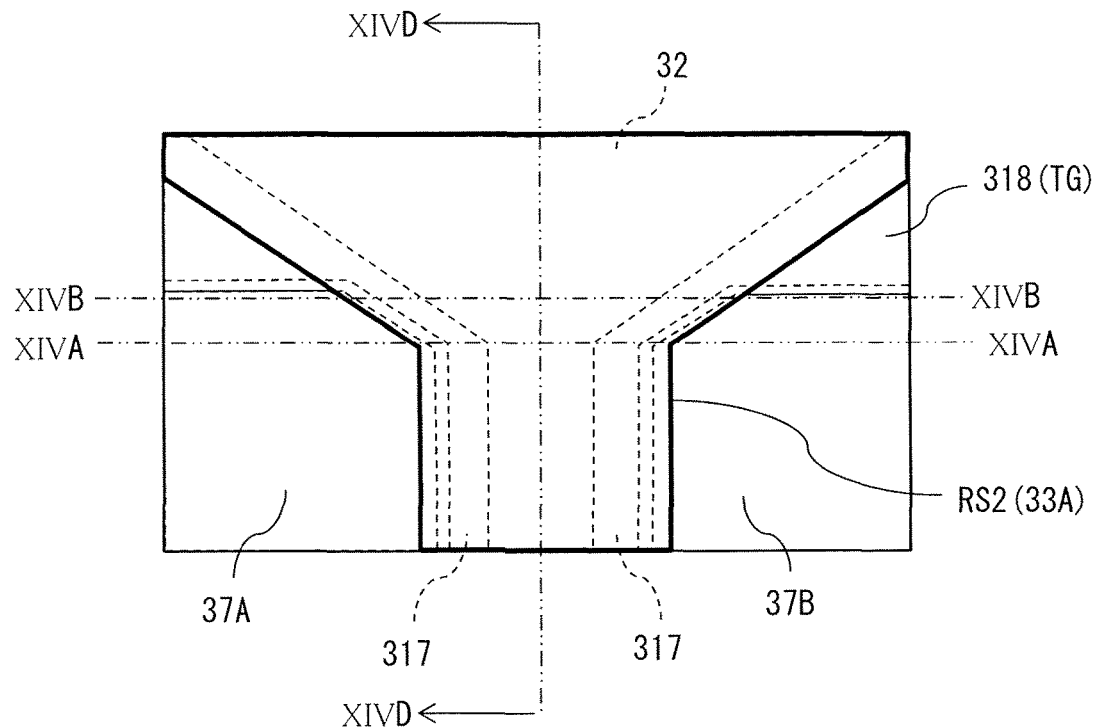
FIG. 14C is a plan view illustrating the same process as the process in FIG. 14A, and corresponding to FIG. 3.
Figure 14D:
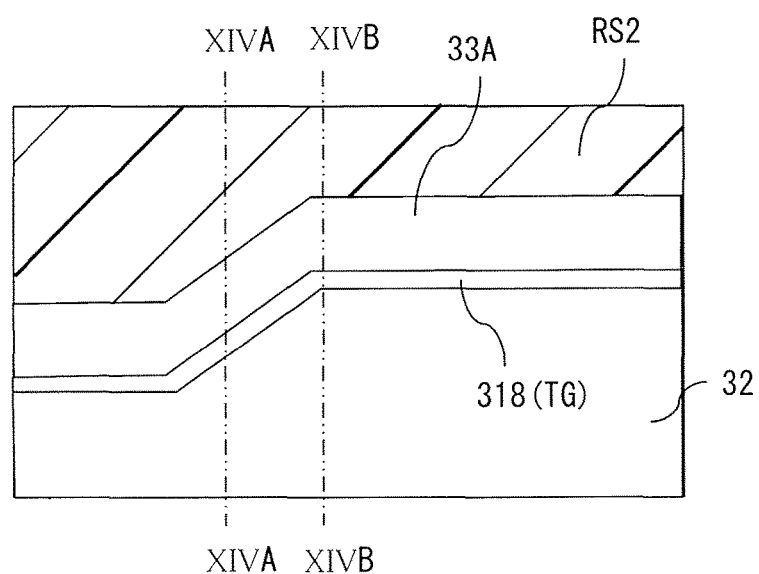
FIG. 14D is a sectional diagram illustrating the same process as the process in FIG. 14A, and corresponding to FIG. 4.

The main part of the thin film magnetic head 10 may be formed, for example, as follows. First, as illustrated in FIG. 7A to FIG. 7D, the leading gap LG, the magnetic pole 32, the pair of side shields 37A and 37B, and the pair of side gaps SG are each formed on the leading shield 29. At the time, the total width of the magnetic pole 32 and the pair of side gaps SG becomes the width W3. Note that FIG. 7A is a sectional diagram in an arrow direction along a VIIA-VIIA line in FIG. 7C, and illustrates a cross-sectional structure at a position where the ABS 11S is finally formed. Therefore, FIG. 7A corresponds to FIG. 5. FIG. 7B corresponds to FIG. 6, and illustrates a cross-sectional structure in an arrow direction along a VIIB-VIIB line in FIG. 7C. FIG. 7C corresponds to FIG. 3, and is a plan view illustrating a process in the method of manufacturing the thin film magnetic head 10. FIG. 7D corresponds to FIG. 4, and illustrates a cross-sectional structure in an arrow direction along a VIID-VIID line in FIG. 7C. This holds true also for FIG. 8 to FIG. 14 as follows.

Next, as illustrated in FIG. 8A to FIG. 8D, the insulating layer 318 (to become the trailing gap TG) is formed on the entire surface to cover the magnetic pole 32, the pair of side shields 37A and 37B, and the pair of side gaps SG.

Next, as illustrated in FIG. 9A to FIG. 9D, a resist pattern RS1 is formed to cover a region, which corresponds to the magnetic pole 32 and the pair of side gaps SG, on the insulating layer 318. At the time, the resist pattern RS1 is formed to have the width W1.

Next, as illustrated in FIG. 10A to FIG. 10D, the insulating layer 318 in an exposed region not covered by the resist pattern RS1 is selectively etched utilizing the resist pattern RS1 as a mask. At the time, this may be performed by, for example, milling or reactive-ion etching (RIE). A part of the insulating layer 318 thereby becomes the trailing gap TG having a planar shape corresponding to the resist pattern RS1. In addition, the pair of side shields 37A and 37B become exposed.

Afterwards, the trailing gap TG becomes exposed by removal of the resist pattern RS1, as illustrated in FIG. 11A to FIG. 11D.

Subsequently, as illustrated in FIG. 12A to FIG. 12D, a magnetic film 33AZ, which later becomes the first magnetic layer 33A of the trailing shield 33, is formed on the entire surface to cover the trailing gap TG as well as the pair of side shields 37A and 37B. At the time, the magnetic film 33AZ is formed to cover the surface TG1 and the end surface TG2 of the trailing gap TG.

Next, as illustrated in FIG. 13A to FIG. 13D, a resist pattern RS2 is formed to cover a region, which overlaps the magnetic pole 32, the pair of side gaps SG, and the trailing gap TG, on the magnetic film 33AZ. At the time, the resist pattern RS2 is formed to have the width W2.

Next, as illustrated in FIG. 14A to FIG. 14D, the magnetic film 33AZ in an exposed region not covered by the resist pattern RS2 is selectively etched utilizing the resist pattern RS2 as a mask. The magnetic film 33AZ thereby becomes the first magnetic layer 33A having a planar shape corresponding to the resist pattern RS2 and having the width W2. In addition, the pair of side shields 37A and 37B become exposed again.

Further, the resist pattern RS2 is removed, and then the second magnetic layer 33B is formed to cover the first magnetic layer 33A, thereby completing the trailing shield 33.

[Operation and Action of Magnetic Disk Unit]

Subsequently, operation and action of a magnetic disk unit including the thin film magnetic head 10 that is configured as above are described.

In this magnetic disk unit, when writing (recording) and reading (reproducing) of magnetic information are performed, the magnetic disk 2 is rotated at high speed in a direction of an arrow 2R (FIG. 1) by the spindle motor 9, and the slider 4A thereby floats from the recording surface of the magnetic disk 2. In this operation, the ABS 11S of the slider 4A (the thin film magnetic head 10) is in a state of facing the recording surface of the magnetic disk 2, with a fixed distance therebetween.

Here, in order to perform high density recording of the magnetic information, it is desirable to increase a recording magnetic field by avoiding magnetic saturation of the magnetic pole 32 and to enhance inclination of the recording magnetic field.

In this regard, in the present embodiment, compatibility between the increase of the recording magnetic field and the improvement of the inclination of the recording magnetic field is achievable. Specifically, the first magnetic layer 33A with high saturation flux density is provided on the trailing side of the magnetic pole 32, and thereby a return recording magnetic field (a return field), which returns via the magnetic disk 2 after being emitted from the magnetic pole 32 to the magnetic disk 2, is allowed to be taken in effectively. Further, the magnetic pole 32 and the trailing shield 33 including the first magnetic layer 33A are separated with a fixed distance therebetween by the trailing gap TG, and therefore it is possible to prevent a direct magnetic flux leakage from the magnetic pole 32 to the trailing shield 33. Furthermore, the width W2 of the first magnetic layer 33A is larger than the width W1 of the trailing gap TG, and therefore, for example, an effective volume of a high saturation flux density material in the cross track direction may increase. For this reason, the return field towards the trailing side increases, and the improvement of the recording magnetic field as well as the improvement of the inclination of the recording magnetic field may be expected.

In addition, in the present embodiment, in manufacturing the thin film magnetic head 10, the patterning of the trailing gap TG and the patterning of the first magnetic layer 33A are performed using the resist patterns RS1 and RS2 that are independent of each other. For this reason, the planar shape of the trailing gap TG and the planar shape of the first magnetic layer 33A are each formed with high accuracy.

Figure 15A:
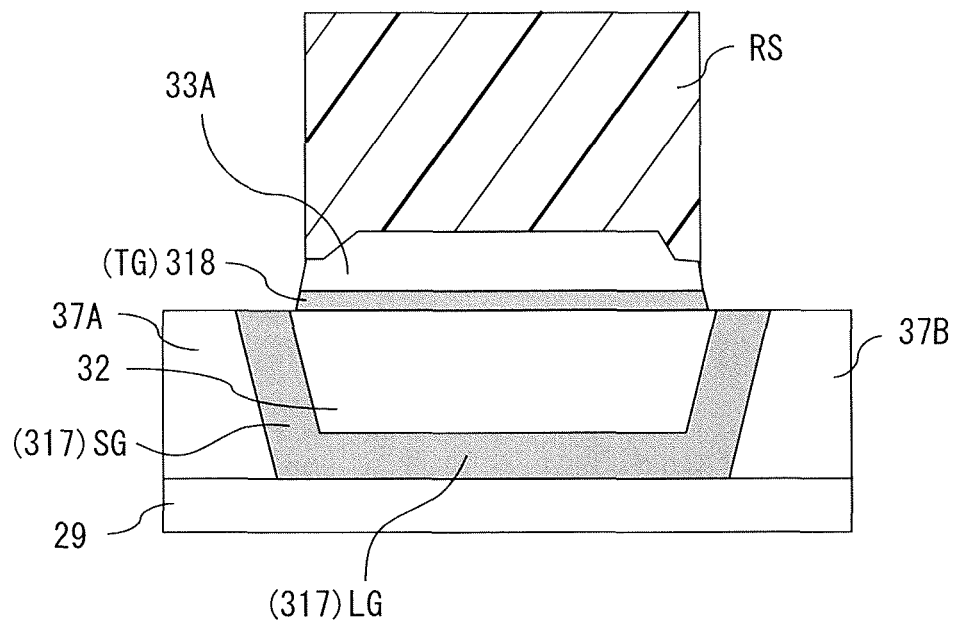
FIG. 15A is a sectional diagram illustrating a process of a method of manufacturing a thin film magnetic head taken as a reference example.
Figure 15B:
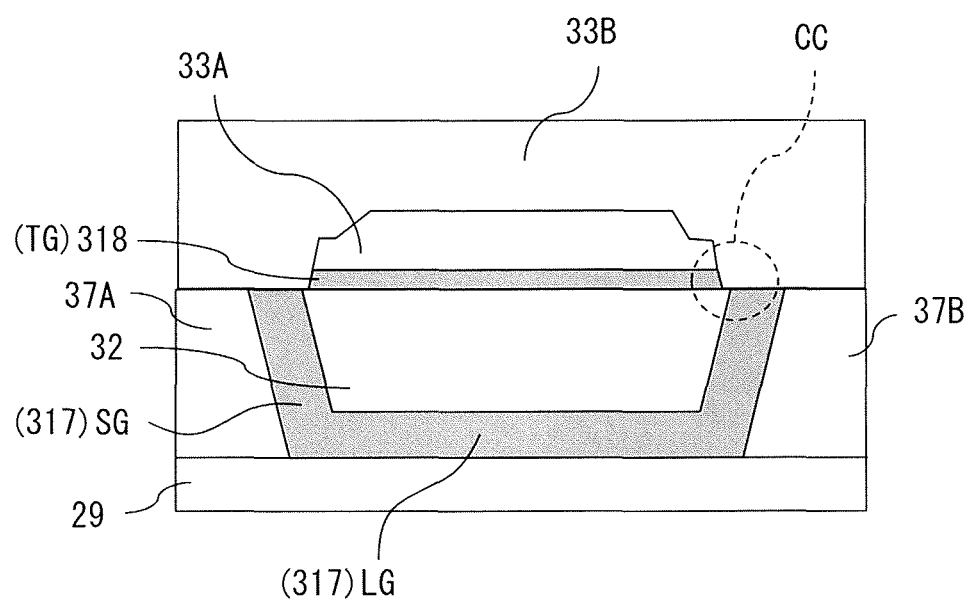
FIG. 15B is a sectional diagram illustrating the thin film magnetic head taken as the reference example.

In contrast, for example, as in a reference example illustrated in FIG. 15A, when patterning is performed collectively on the trailing gap TG and the first magnetic layer 33A by using a single resist pattern RS as a mask, highly accurate etching is not achievable at a position away from the ABS 11S, and therefore there may be, for example, a case where the magnetic pole 32 is exposed. This problem arises because the total thickness of the trailing gap TG and the first magnetic layer 33A is large, and it is necessary to increase the thickness of the resist pattern RS as well, in order to remove them selectively at a time. When the resist pattern RS is formed by exposing a resist film, the shape of an end surface of the resist pattern RS becomes unstable due to wraparound of light and the like, and it is difficult to obtain desirable shape and dimensions. As a result, contact between the exposed part of the magnetic pole 32 and the second magnetic layer 33B takes place in a part enclosed by a dashed line CC in FIG. 15B, and a leakage flux from the magnetic pole 32 to the trailing shield 33 occurs (FIG. 15B). According to the present embodiment, as described above, the highly accurate planar shape is obtained for both the trailing gap TG and the first magnetic layer 33A, and therefore contact between the magnetic pole 32 and the trailing shield 33 is sufficiently avoided. As a result, improvement of WATE characteristics may be expected.

For the above-described reasons, according to the present embodiment, an advantage is obtained in terms of support for high density recording.

EXAMPLES

Some experimental examples including examples of the invention are described.

Experimental Example 1-1

A sample of the thin film magnetic head 10 in the above-described embodiment was fabricated, and recording properties, which are; bit error rate (BER), adjacent track interference (ATI)-delta bit error rate (dBER), wide area track erasure (WATE)-dBER, and over write (OW), were each evaluated. Results are illustrated in Table 1. Here, ATI-dBER is an index representing a degree of deterioration of BER in a center track after recording operation for a track (an adjacent track) adjacent to specific one track (hereinafter referred to as center track) is executed 100 times. In other words, this is an index for evaluating spread of a magnetic flux of a recording magnetic field from the magnetic pole 32 as well as a function of the side shields 37A and 37B. WATE-dBER is an index representing a degree of deterioration in pre-recorded recording signal of ±5 µm, by performing recording on the central track in a range of ±5 µm, and then repeating recording 10,000 times after moving to the central track. In other words, WATE-dBER is an index for evaluating a degree of recording signal erasure due to a leakage flux from the side shields 37A and 37B, the leading shield 29, and the trailing shield 33. OW is an index representing a remaining degree of a high frequency signal when the high frequency signal recorded beforehand is overwritten with a low frequency signal, in a certain track. In other words, this is an index for evaluating recording magnetic field strength. Here, near the ABS 11S, the width W1 (ABS) of the trailing gap TG was provided to match with the width W3 (ABS), and the width W1 (ABS) was provided to be smaller than the width W2 (ABS) of the first magnetic layer 33A. In other words, W1 (ABS)=W3 (ABS), and W1 (ABS)<W2 (ABS) were satisfied. To be specific, the width W2 (ABS) was 2.0 times larger than the width W1 (ABS). Note that no contact part is present between the magnetic pole 32 and the trailing shield 33.

TABLE 1

| Experimental Example | Ratio of W1 to W3 | Ratio of W2 to W1 | Contact Part | BER | ATI-dBER | WATE-dBER | OW dB |
|---|---|---|---|---|---|---|---|
| Experimental Example 1-1 | 1.0 | 2.0 | Absent | $10^{-2.3}$ | $10^{+0.10}$ | $10^{+0.30}$ | 32 |
| Experimental Example 1-2 | 1.5 | 1.3 | Absent | $10^{-2.4}$ | $10^{+0.15}$ | $10^{+0.30}$ | 33 |
| Experimental Example 1-3 | 2.0 | 1.3 | Absent | $10^{-2.5}$ | $10^{+0.15}$ | $10^{+0.30}$ | 35 |
| Reference Example 1-1 | 2.0 | 1.0 | Absent | $10^{-2.4}$ | $10^{+0.30}$ | $10^{+0.50}$ | 35 |
| Reference Example 1-2 | 1.0 | 1.0 | Present | $10^{-2.0}$ | $10^{+0.10}$ | $10^{+0.40}$ | 30 |
| Reference Example 1-3 | 1.0 | 1.0 | Absent | $10^{-2.3}$ | $10^{+0.10}$ | $10^{+0.30}$ | 30 |

Experimental Example 1-2

Except that the ratio of the width W1 (ABS) to the width W3 (ABS) and the ratio of the width W2 (ABS) to the width W1 (ABS) were each changed, a sample of the thin film magnetic head 10 was fabricated under the same conditions as those of Experimental Example 1-1, and was similarly evaluated. Specifically, the width W1 (ABS) was 1.5 times larger than the width W3 (ABS), and the width W2 (ABS) was 1.3 times larger than the width W1 (ABS). Results are illustrated in Table 1. Note that no contact part was present between the magnetic pole 32 and the trailing shield 33.

Experimental Example 1-3

Except that the ratio of the width W1 (ABS) to the width W3 (ABS) and the ratio of the width W2 (ABS) to the width W1 (ABS) were each changed, a sample of the thin film magnetic head 10 was fabricated under the same conditions as those of Experimental Example 1-1, and was similarly evaluated. Specifically, the width W1 (ABS) was 2.0 times larger than the width W3 (ABS) and the width W2 (ABS) was 1.3 times larger than the width W1 (ABS). Results are illustrated in Table 1. Note that no contact part is present between the magnetic pole 32 and the trailing shield 33.

Reference Example 1-1

Next, a sample of a thin film magnetic head was fabricated as a reference example in which the width W2 (ABS) was made to match with the width W1 (ABS) and the width W1 (ABS) was 2.0 times larger than the width W3 (ABS), and the sample was evaluated in a manner similar to that of Experimental Example 1-1. Results are illustrated in Table 1. Note that no contact part is present between the magnetic pole 32 and the trailing shield 33.

Reference Example 1-2

Except that the width W1 (ABS) was made to match with the width W3 (ABS), a sample of a thin film magnetic head was fabricated under the same conditions as those of Reference Example 1-1, and was similarly evaluated. However, in the present reference example, a contact part is present between the magnetic pole 32 and the trailing shield 33 in inside of the thin film magnetic head, as illustrated in FIG. 15B. Results are illustrated in Table 1.

Reference Example 1-3

Next, except that the width W1 (ABS) was made to match with the width W3 (ABS), a sample of a thin film magnetic head was fabricated under the same conditions as those of Reference Example 1-1, and was similarly evaluated. Results are illustrated in Table 1. Note that no contact part is present between the magnetic pole 32 and the trailing shield 33.

As apparent from the results in Table 1, relatively favorable WATE-dBER was obtained in Experimental Examples 1-1 to 1-3. In Reference Example 1-1, since the width W1 was large, deterioration of WATE-dBER was confirmed. In Reference Example 1-2, numerical deterioration of each of BER, WATE-dBER and OW occurred. This is because, in Reference Example 1-2, although the width W1 is small, the contact part is present between the magnetic pole 32 and the trailing shield 33, and therefore a leakage flux from the magnetic pole 32 to the trailing shield 33 increased. In Reference Example 1-3, deterioration of OW was confirmed. This is conceivably because a return recording magnetic field (a return field), which returns from the magnetic pole 32 to the trailing shield 33 via the magnetic disk 2, decreased due to a reduction in volume of the first magnetic layer 33A.

From the above-described results, the thin film magnetic head 10 of the present embodiment was confirmed to be suitable for high density recording.

MODIFICATIONS

Although the invention has been described above with reference to the embodiment, the invention is not limited to the above-described embodiment, and various modifications may be made. For example, although the perpendicular magnetic recording head of the invention has been applied to a composite head, the application is not necessarily limited thereto, and the perpendicular magnetic recording head of the invention may be applied to a recording only head not including a reproducing head section.

In addition, in the present embodiment, although the CIP-GMR element has been described as an example of the reproducing element, the reproducing element is not limited thereto. Alternatively, the reproducing element may be of current in the plane (CIP) type. Still alternatively, a tunneling magnetoresistance (TMR) element including a tunnel junction film may be used.

Further, in the above-described embodiment, the spiral structure, in which the lower coil 18 and the upper coil 41 wind in the stacked-layer plane (the XY plane), is provided, but the invention is not limited thereto. The perpendicular magnetic recording head of the invention may include, for example, a coil having a helical structure of winding around the magnetic pole 32 extending in a direction (the Y-axis direction) orthogonal to the ABS 11S. Furthermore, the number of turns (the number of windings) is not limited in particular, and may be appropriately selected for the spiral structure or the helical structure, whichever is adopted.

The correspondence relationships between the reference numerals and the components of the present embodiment are collectively illustrated as follows:

1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . driver, 7 . . . fixed shaft, 8 . . . bearing, 9 . . . spindle motor, 10 . . . thin film magnetic head, 11 . . . base, 11A . . . element forming surface, 11S . . . air bearing surface (ABS), 13 . . . insulating layer, 14 . . . reproducing head section, 16 . . . recording head section, 17 . . . protective layer, 18 . . . lower coil, 181 . . . forward part, 182 . . . backward part, 19 . . . lower back gap, 20 (20A to 20D) . . . insulating layer, 21 . . . lower shield layer, 22 . . . MR element, 23 . . . upper shield layer, 24, 25, 27 . . . insulating layer, 26 . . . intermediate shield layer, 28 . . . lower yoke, 29 . . . leading shield, 31, 34 . . . insulating layer, 32 . . . magnetic pole, 33 . . . trailing shield, 33A . . . first magnetic layer, 33B . . . second magnetic layer 33B, 36 . . . pillar, 37A and 37B . . . side shields, upper coil, 411 . . . forward part, 412 . . . backward part, 43 . . . upper yoke, 44 . . . upper back gap, BG . . . back gap, LG . . . leading gap, SG . . . side gap, TG . . . trailing gap.

What is claimed is:

1. A perpendicular magnetic recording head having an air bearing surface, comprising:
    a magnetic pole;
    a pair of side shields disposed to face each other with the magnetic pole interposed therebetween in a cross track direction;
    a pair of side gaps each provided between the magnetic pole and the pair of side shields;
    a trailing gap provided to cover the magnetic pole and the pair of side gaps, and having a first width in the cross track direction;
    a first magnetic layer covering the trailing gap and having a first magnetic layer width larger than the first width in the cross track direction; and
    a second magnetic layer provided to cover the first magnetic layer, the second magnetic layer having a second magnetic layer width in the cross track direction, wherein
    the second magnetic layer width in the cross track direction in the second magnetic layer at the air bearing surface is larger than the first magnetic layer width in the cross track direction in the first magnetic layer,
    the first magnetic layer has a first saturation flux density,
    the second magnetic layer has a second saturation flux density, and
    the first saturation flux density is higher than the second saturation flux density.

2. The perpendicular magnetic recording head according to claim 1, wherein the first magnetic layer is provided to cover a surface and an end surface of the trailing gap.

3. The perpendicular magnetic recording head according to claim 1, wherein the first magnetic layer and the second magnetic layer integrally form a trailing shield.

4. The perpendicular magnetic recording head according to claim 1, wherein the pair of side shields have a third saturation flux density lower than the first saturation flux density.

5. The perpendicular magnetic recording head according to claim 1, wherein the magnetic pole and the first magnetic layer are away from each other, and the magnetic pole and the second magnetic layer are away from each other.

6. The perpendicular magnetic recording head according to claim 1, satisfying a conditional expression:

$$W3 \leq W1 < 2 \times W3 \tag{1}$$

where
    W1: the first width of the trailing gap in the cross track direction, and
    W3: a third width that is a total width of the magnetic pole and the pair of side gaps, in the cross track direction.

7. The perpendicular magnetic recording head according to claim 1, wherein the first magnetic layer is made of a material selected from the group consisting of an iron-cobalt alloy (FeCo), an iron-palladium alloy (FePd), an iron-cobalt-palladium alloy (FeCoPd), and iron nitride (FeN).

8. The perpendicular magnetic recording head according to claim 1, wherein
    the magnetic pole includes an end portion that includes a first end surface exposed on the air bearing surface and whose thickness reduces toward the air bearing surface;
    the first magnetic layer includes a second end surface exposed on the air bearing surface, and is provided in a region overlapping with the end portion in a thickness direction along the air bearing surface; and
    the second magnetic layer includes a third end surface exposed on the air bearing surface and is provided in a region overlapping with the end portion in the thickness direction.

9. A head gimbals assembly comprising:
    a magnetic head slider including the perpendicular magnetic recording head according to claim 1; and
    a suspension including a first end to which the magnetic head slider is attached, and a second end.

10. A head arm assembly comprising:
    a magnetic head slider including the perpendicular magnetic recording head according to claim 1;
    a suspension including a first end to which the magnetic head slider is attached, and a second end; and
    an arm supporting the second end of the suspension.

11. A magnetic disk unit including a magnetic recording medium and a head arm assembly, the head arm assembly comprising:
    a magnetic head slider including the perpendicular magnetic recording head according to claim 1;
    a suspension including a first end to which the magnetic head slider is attached, and a second end; and
    an arm supporting the second end of the suspension.

* * * * *